United States Patent (10) Patent No.: US 7,506,522 B2
Bleaking et al. (45) Date of Patent: *Mar. 24, 2009

(54) HIGH REFRACTIVE INDEX HOMOGENEITY FUSED SILICA GLASS AND METHOD OF MAKING SAME

(75) Inventors: Daniel Joseph Bleaking, Wilmington, NC (US); Dana C. Bookbinder, Corning, NY (US); Richard M. Fiacco, Corning, NY (US); Kenneth E. Hrdina, Horseheads, NY (US); Pushkar Tandon, Corning, NY (US); John E. Maxon, Canton, NY (US); Kimberly Ann Wilbert, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 720 days.

This patent is subject to a terminal disclaimer.

(21) Appl. No.: 11/148,764

(22) Filed: Jun. 8, 2005

(65) Prior Publication Data

US 2006/0137398 A1 Jun. 29, 2006

Related U.S. Application Data

(60) Provisional application No. 60/640,732, filed on Dec. 29, 2004.

(51) Int. Cl.
*C03B 20/00* (2006.01)
*C03C 3/06* (2006.01)
(52) U.S. Cl. ............... 65/17.3; 65/17.4; 65/32.1; 501/53; 501/54
(58) Field of Classification Search ............ 501/54, 501/53; 65/17.3, 17.4, 32.1
See application file for complete search history.

(56) References Cited

U.S. PATENT DOCUMENTS

| 5,211,732 A | 5/1993 | Abbott et al. ........... 65/421 |
| 5,325,230 A | 6/1994 | Yamagata et al. ........ 359/350 |
| 6,143,676 A * | 11/2000 | Ohashi et al. ........... 501/54 |
| 6,324,871 B1 | 12/2001 | Nakamura et al. ........ 65/421 |
| 6,376,401 B1 | 4/2002 | Kondo et al. ........... 501/54 |
| 6,451,719 B1 | 9/2002 | Yamagata ............... 501/54 |
| 6,499,317 B1 | 12/2002 | Ikuta et al. ............ 65/378 |
| 2002/0038557 A1 | 4/2002 | Matsuo et al. .......... 65/174 |
| 2003/0126893 A1 | 7/2003 | Tobisaka et al. ........ 65/531 |

FOREIGN PATENT DOCUMENTS

| CA | 2079699 A | * | 4/1994 |
| JP | 02-080343 A | * | 3/1990 |
| JP | 04367536 | | 12/1992 |
| JP | 06-234545 A | * | 8/1994 |
| JP | 10324538 | | 12/1998 |
| JP | 2001146434 | | 5/2001 |

* cited by examiner

*Primary Examiner*—Anthony J Green
(74) *Attorney, Agent, or Firm*—Robert P. Santandrea; Siwen Chen

(57) ABSTRACT

Disclosed are high purity synthetic silica glass material having a high OH concentration homogeneity in a plane perpendicular to the optical axis, and process of making the same. The glass has high refractive index homogeneity. The glass can have high internal transmission of at least 99.65%/cm at 193 nm. The process does not require a post-sintering homogenization step. The controlling factors for high compositional homogeneity, thus high refractive index homogeneity, include high initial local soot density uniformity in the soot preform and slow sintering, notably isothermal treatment during consolidation.

27 Claims, 16 Drawing Sheets

HIGH REFRACTIVE INDEX HOMOGENEITY FUSED SILICA GLASS AND METHOD OF MAKING SAME

CROSS-REFERENCE TO RELATED APPLICATIONS

The present invention claims priority of U.S. Provisional Patent Application Ser. No. 60/640,732, entitled "HIGH REFRACTIVE INDEX HOMOGENEITY FUSED SILICA GLASS AND METHOD OF MAKING SAME," filed on Dec. 29, 2004, the content of which is relied upon and incorporated herein by reference in its entirety.

FIELD OF THE INVENTION

The present invention relates to fused silica material and process of making the same. In particular, the present invention relates to high purity fused silica material having high refractive index homogeneity and methods of making the same. The present invention is useful, for example, in producing high purity synthetic silica materials for optical members used in applications operating in deep and vacuum UV regions.

BACKGROUND OF THE INVENTION

As practiced commercially, fused silica optical members such as lenses, prisms, filters, photomasks, reflectors, etalon plates and windows, are typically manufactured from bulk pieces of fused silica made in large production furnaces. Bulk pieces of fused silica manufactured in large production furnaces are known in the art as boules or ingots. Blanks are cut from boules or ingots, and finished optical members are manufactured from glass blanks, utilizing manufacturing steps that may include, but are not limited to, cutting, polishing, and/or coating pieces of glass from a blank. Many of these optical members are used in various apparatus employed in environments where they are exposed to ultraviolet light having a wavelength of about 360 nm or less, for example, an excimer laser beam or some other ultraviolet laser beam. The optical members are incorporated into a variety of instruments, including lithographic laser exposure equipment for producing highly integrated circuits, laser fabrication equipment, medical equipment, nuclear fusion equipment, or some other apparatus which uses a high-power ultraviolet laser beam.

As the energy and pulse rate of lasers increase, the optical members which are used in conjunction with such lasers, are exposed to increased levels of laser radiation. Fused silica members have become widely used as the manufacturing material of choice for optical members in such laser-based optical systems due to their excellent optical properties and resistance to laser induced damage.

Laser technology has advanced into the short wavelength, high energy ultraviolet spectral region, the effect of which is an increase in the frequency (decrease in wavelength) of light produced by lasers. Of particular interest are short wavelength excimer lasers operating in the UV and deep UV (DUV) and vacuum UV wavelength ranges, which includes, but are not limited to, lasers operating at about 248 nm, 193 nm, 157 nm and even shorter wavelengths. Excimer laser systems are popular in microlithography applications, and the shortened wavelengths allow for increased feature resolution and thus line densities in the manufacturing of integrated circuits and microchips, which enables the manufacture of circuits having decreased feature sizes. A direct physical consequence of shorter wavelengths (higher frequencies) is higher photon energies in the beam due to the fact that each individual photon is of higher energy. In such excimer laser systems, fused silica optics are exposed to high energy photon irradiation levels for prolonged periods of time resulting in the degradation of the optical properties of the optical members.

It is known that such laser induced degradation adversely affects the optical properties and performance of the fused silica optics by decreasing light transmission levels, discoloring the glass, altering the index of refraction, altering the density, and increasing absorption levels of the glass. Over the years, many methods have been suggested for improving the optical damage resistance of fused silica glass. It has been generally known that high purity fused silica prepared by such methods as flame hydrolysis, CVD-soot remelting process, plasma CVD process, electrical fusing of quartz crystal powder, and other methods, are susceptible to laser damage to various degrees.

A common suggestion has been to increase the OH content of such glass to a high level. For example, Escher, G. C., *KrF Laser Induced Color Centers In Commercial Fused Silicas*, SPIE Vol. 998, Excimer Beam Applications, pp. 30-37 (1988), confirms that defect generation rate is dependent upon the fused silica OH content, and that "wet" silica is the material of choice for KrF applications. Specifically, they note that high OH content silica is more damage resistant than low OH silica.

U.S. Pat. No. 5,086,352 and the related U.S. Pat. No. 5,325,230 has also disclosed that the ability to resist optical deterioration from exposure to a short wavelength ultraviolet laser beam depends on the OH group content in the presence of hydrogen. Specifically, these references show that for high purity silica glass having low OH content, KrF excimer laser durability is poor. Thus, they suggest an OH content of at least 50 ppm. Similarly, Yamagata, S., *Improvement of Excimer Laser Durability of Silica Glass*, Transactions of the Materials Research Society of Japan, Vol. 8, pp. 82-96 (1992), discloses the effect of dissolved hydrogen on fluorescence emission behavior and the degradation of transmission under irradiation of KrF excimer laser ray for high purity silica glass containing OH groups up to 750 ppm by weight such as those synthesized from high purity silicon tetrachloride by the oxygen flame hydrolysis method.

Others have also suggested methods of increasing the optical durability of fused silica. For example, Faile, S. P., and Roy, D. M., *Mechanism of Color Center Destruction in Hydrogen Impregnated Radiation Resistant Glasses*, Materials Research Bull., Vol. 5, pp. 385-390 (1970), have disclosed that hydrogen-impregnated glasses tend to resist gamma ray-induced radiation. Japanese Patent Abstract 40-10228 discloses a process by which quartz glass article made by melting is heated at about 400 to 1000° C. in an atmosphere containing hydrogen to prevent colorization due to the influence of ionizing radiation (solarization). Similarly, Japanese Patent Abstract 39-23850 discloses that the transmittance of UV light by silica glass can be improved by heat treating the glass in a hydrogen atmosphere at 950 to 1400° C. followed by heat treatment in an oxygen atmosphere at the same temperature range.

Shelby, J. E., *Radiation Effects in Hydrogen-impregnated Vitreous Silica*, J. Applied Physics, Vol. 50, No. 5, pp. 3702-06 (1979), suggests that irradiation of hydrogen-impregnated vitreous silica suppresses the formation of optical defects, but that hydrogen impregnation also results in the formation of large quantities of bound hydroxyl and hydride, and also results in the expansion or decrease in density of the glass.

Recently, U.S. Pat. No. 5,410,428 has disclosed a method of preventing induced optical degradation by a complicated combination of treatment processes and compositional manipulations of the fused silica members to achieve a particular hydrogen concentration and refractive index, in order to improve resistance to UV laser light degradation. It is suggested that under such UV irradiation some chemical bonds between Silicon arid oxygen in the network structure of the fused silica is generally broken and then rejoins with other structures resulting in an increased local density and an increased local refractive index of the fused silica at the target area.

More recently, U.S. Pat. No. 5,616,159 to Araujo et al. disclosed a high purity fused silica having high resistance to optical damage up to $10^7$ pulses (350 mJ/cm$^2$/pulse) at the laser wavelength of 248 nm and a method for making such glass. The composition disclosed in Araujo et al. comprises at least 50 ppm OH and has a concentration of $H_2$ greater than $1\times10^{18}$ molecules/cm$^3$.

While the above suggested methods are at least partially effective in reducing the absorption induced at 215 and 260 nm, there has been little or no suggestion for addressing optical damage caused by radiation-induced compaction resulting from prolonged exposure to excimer lasers. And given the semiconductor industry's reliance on excimer lasers and materials that transmit that energy to make integrated circuit chips and other products and the constant drive towards decreased line width and the necessary wavelength of the incident light and the resultant increase in the laser energy level, it follows that the fused silica material requirements become much more stringent. As such, there continues to be a need for more improved fused silica glasses, particularly fused silica material which is as inert as possible with respect to the incident light energy and thus exhibiting increased resistance to optical damage during prolonged exposure to ultraviolet laser radiation, in particular, resistance to optical damage associated with prolonged exposure to UV radiation caused by 193 and 248 nm excimer lasers.

It is important that the fused silica materials used for elements in the light path in precision optical devices and applications have high refractive index homogeneity. However, unfortunately, depending on the method of production of the fused silica material, refractive index variation in the materials along the light path or transverse to the light path tends to occur. The variation may be present at high frequency and/or low frequency. A typical form of high frequency index variation is striae. Irregular and unpredictable refractive index variation in an optical member in directions perpendicular to the optical axis is particularly detrimental and undesirable. Therefore, measures have to be taken in the production of fused silica materials to improve the refractive index homogeneity.

In the prior art, various methods have been disclosed and suggested to improve the refractive index homogeneity of the fused silica glass boule produced. For example, United States Patent Application Publication No. 2003/0,139,277 A1 discloses that doping aluminum into the fused silica boule can improve the axial refractive index homogeneity. U.S. Pat. No. 6,698,248 discloses an improved furnace design where the distance between the burners and the soot collecting surface remains substantially constant that enhances the axial refractive index homogeneity of the fused silica boule produced in the furnace. Other methods such as oscillating the soot collecting surface have been disclosed and used in the commercial production of fused silica boules in order to improve the refractive index homogeneity, in addition to other optical and physical properties.

However, all these approaches were adopted in the context of producing fused silica boules in a direct-deposit furnace exemplified in FIG. 1 of United States Patent Application Publication No. 2003/0,139,277. In a direct-deposit furnace, silica soot particles produced or provided are collected at a high temperature on a collecting surface, where they are consolidated to form a transparent fused silica boule. Therefore, in this fused silica production process, soot particle deposition and consolidated glass formation are carried out in a single step in a single furnace.

Another approach of forming fused silica glass body involves a two step process. First, silica soot particles are formed and deposited on a soot collecting surface to form a porous silica body. In a second step, after optional further treatment, the porous silica body is consolidated into a transparent glass body by sintering at a high temperature. Unique issues relating to the control of refractive index uniformity in this process have arisen. For example, it has been discovered that the refractive index in a plane transverse to the optical axis may vary to an unacceptable level.

Therefore, there exists a need for an improved process for producing high purity synthetic fused silica materials and such materials having improved optical performance. The present invention satisfies this need.

SUMMARY OF THE INVENTION

According to one aspect of the present invention, it is provided synthetic silica glass material with a OH content from 0.1 to 1300 ppm by weight with a variation in OH concentration measured across a plane perpendicular to an axis thereof of less than 20 ppm by weight, preferably less than 10 ppm, more preferably less than 5 ppm, still more preferably less than 2 ppm. Desirably, when measured in a plane perpendicular to the axis, the material has a refractive index variation of less than 10 ppm, preferably less than 5 ppm, more preferably less than 2 ppm, most preferably less than 1 ppm. In one embodiment of the synthetic glass material of the present invention, the material comprises striae along the axis. Such straie are preferably essentially parallel to the planes perpendicular to the axis described above in this paragraph. In those different layers of striae, the average OH concentration and refractive index may differ slightly within an acceptable range.

In one embodiment of the silica glass material of the present invention, the glass further contains between $1\times10^{15}$ to $5\times10^{18}$ molecules/cm$^3$ of $H_2$. In a preferred embodiment of the glass material of the present invention, the material comprises less than 50 ppm, preferably less than 10 ppm by weight of chlorine. Preferably, the silica glass material of the present invention comprises less than 10 ppb alkali, alkaline earth and transition metal. Preferably, the silica glass material of the present invention has a fictive temperature between 800-1200° C. and a variation of fictive temperature of less than 50° C., preferably less than 10° C. Preferably, the silica glass material of the present invention has a birefringence level of less than 2 nm/cm, preferably less than 1 nm/cm, still more preferably less than 0.5 nm/cm, most preferably less than 0.2 nm/cm. Preferably, the silica glass material of the present invention is essentially free of oxygen-deficient center. In a preferred embodiment of the silica glass material of the present invention, the glass further comprises fluorine. A desirable fluorine concentration range in the glass is from 1 to 5000 ppm by weight, preferably from 1 to 2000 ppm. Preferably the synthetic silica glass of the present invention has an internal transmission at 193 nm of at least 99.65%/cm, more preferably at least 99.70%/cm, still more preferably at least 99.75%/cm, most preferably at least 99.80%/cm.

A second aspect of present invention is an optical glass member made of the synthetic silica glass material of the present invention described above, having an optical axis parallel to the axis of the material perpendicular to which the glass material has a variation of OH concentration of less than 20 ppm, preferably less than 10 ppm, most preferably less than 5 ppm. Preferably, the optical glass member of the present invention has an internal transmission of at least 99.65%/cm, more preferably at least 99.70%/cm, still more preferably at least 99.75%/cm, and most preferably at least 99.80%/cm along the optical axis.

According to a third aspect of the present invention, it is provided a process for making a synthetic silica glass material with an OH concentration from 0.1 to 1300 ppm by weight with a variation in OH concentration measured across a plane perpendicular to an axis thereof of less than 20 ppm by weight, preferably less than 10 ppm, most preferably less than 5 ppm, comprising the following steps:
  (i) providing high purity silica soot particles;
  (ii) forming a porous preform from the silica soot particles having bulk density of from 0.2 to 1.6 g/cm$^3$, wherein the preform has a high local soot density uniformity;
  (iii) optionally purifying the porous preform; and
  (iv) consolidating the preform into dense silica glass.

In a preferred embodiment of the process of the present invention, in step (ii), the porous soot preform formed has a bulk density between 0.25 to 1.0 g/cm$^3$. Preferably, in step (ii), the soot preform has a local density variation less than 20% of the average bulk density of the preform measured across a plane. Preferably, in step (i), the silica soot particles are provided by flame hydrolysis of at least one silicon-containing precursor compound, in step (ii), the silica soot preform is formed by depositing the soot to a rotating supporting surface, and steps (i) and (ii), the ratio of the change rates of the flow rates of the precursor compound and $O_2$ provided to the hydrolysis flame via the burner is maintained substantially steady during the initial stage of soot laydown before the flow rates stabilize substantially simultaneously. In a particularly preferred embodiment of the process of the present invention, in step (i), the silica soot particles are provided by flame hydrolysis of a silicon-containing precursor compound, in step (ii), the silica soot preform is formed by depositing the soot to a rotating supporting surface, and in steps (i) and (ii), the ratio of the flow rates of the precursor compound and $O_2$ provided to the hydrolysis flame is maintained substantially steady during the initial stage of soot laydown before the flow rates stabilize substantially simultaneously.

In a preferred embodiment, in step (i), the soot particles are provided by flame hydrolysis of a silicon-containing precursor compound through at least one burner, and in step (ii), the soot preform is formed by depositing the soot particles on a rotating supporting surface, wherein the position of the burner oscillates relative to the supporting surface in a pattern such that the soot deposited onto the supporting surface has a high local soot density homogeneity. Preferably, the pattern is semi-randomized or randomized.

In a preferred embodiment of the process of the present invention, in step (iv), in step (iv), the preform is subject to a temperature elevation rate of less than 0.4° C./minute between 1000-1600° C. More preferably, in step (iv), the preform is subject to a temperature elevation rate of less than 0.2° C./minute between 1150-1450° C. Preferably, in step (iv), the preform is first isothermally held at a temperature between 1150° C. to 1300° C. for at least one hour prior to final densification. More preferably, in step (iv), the preform is first isothermally held at a temperature between 1150° C. and 1300° C. for more than 5 hours, but less than 200 hours. Preferably, in step (iv), the preform is consolidated in an atmosphere comprising helium and water, or helium, water and $O_2$.

The high purity fused silica glass material of present invention has the following advantages: (I) high refractive index homogeneity in directions perpendicular to the optical axis, thus a large clear aperture area; (II) high transmission at short wavelength such as below about 250 nm; and (III) low birefringence; (IV) low level of, or substantially no oxygen-deficient absorption centers; and (V) low laser induced wavefront distortion when subjected to high energy UV laser irradiation. Therefore, the silica glass of the present invention is particularly useful for the production of optical members for use in microlithography applications in the deep UV and vacuum UV regions.

The process of the present invention for the production of high purity synthetic fused silica material does not require the costly and complex mechanical homogenization step of the consolidated glass at very high temperatures. The process is relatively easy to control. The yield of the process can be very high and consistency between different runs can be achieved.

A fourth aspect of the present invention is a silica soot preform having bulk density of 0.20 to 1.6 g/cm$^3$ and a high local soot density uniformity. In a preferred embodiment of the soot preform, it has a local soot density variation of less than 10% of the overall soot density of the preform, or less than 0.1 g/cm$^3$, whichever is greater. Preferably, the silica soot preform of the present invention has an overall bulk density between 0.25 to 1.0 g/cm$^3$. Preferably, the silica soot preform of the present invention has less than 50 ppm by weight of Cl. Preferably, the silica soot preform of the present invention comprises less than 10 ppb alkali, alkaline earth, and transitional metal elements. More preferably, the silica soot preform of the present invention comprises less than 1 ppb alkaline earth and transition metals.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings.

DETAILED DESCRIPTION OF THE INVENTION

Figure 1:
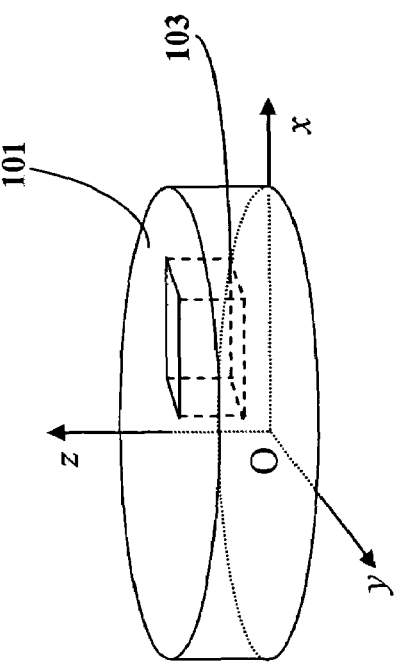
FIG. 1 is a schematic illustration of a piece or a blank of the silica glass material in a xyz orthogonal coordinate system.

As used herein, the term "variation of refractive index," or "refractive index variation," or "Δn," means the maximal variation of refractive indices measured in a plane perpendicular to the optical axis of the glass material or glass optical member along a predetermined direction by using interferometry at about 633 nm (He—Ne laser) (with tilt and piston taken out, as indicated infra). As is typically done by one skilled in the art, when discussing refractive index variation along a certain direction, tilt and piston are subtracted. Therefore, the refractive index variation along a certain direction (such as the radial direction in a sample prepared by using the OVD process) in the meaning of the present application does not include tilt or piston. As indicated below, typically, the optical axis of a glass optical member, a glass blank, or a piece of glass material, is selected to be perpendicular to a plane (a cross-section) in which the measured refractive index inhomogeneity is the smallest, in order to obtain a glass member having large clear aperture area. FIG. 1 in the drawings of the present invention schematically illustrates a piece or a blank of the material of the present invention in a xyz orthogonal coordinate system. The blank 101 has an optical axis z. The plane xOy, perpendicular to axis z, intersects the blank 101 to obtain a cross-section of the blank. When measuring refractive index homogeneity, the sample taken (for example, the sample 103 indicated in FIG. 1) has a uniform thickness. When measured across the cross-section, the variation of refractive index in the desired direction (such as the radial direction of a sample prepared by using the OVD process, or the x direction as illustrated in FIG. 1), with tilt and piston taken out, is less than 5 ppm, preferably less than 2 ppm, more preferably less than 1 ppm. Desirably, the variation of refractive index in both the x and y direction, measured separately, with tilt and piston taken out, is less than 5 ppm, preferably less than 2 ppm, more preferably less than 1 ppm.

The birefringence of the glass is measured by a polarimeter at 633 nm (He—Ne laser) in accordance with methods well established in the art, using, for example, commercially available instruments specifically designed for measuring birefringence.

Parameters such as β-OH in the glass, OH amount in ppm by weight, variation of OH concentration in the glass, and fictive temperature of the glass can be typically derived from the measurement of infrared transmittance of the glass. The wavelength range of interest is 2-5 μm (frequency range 5000 $cm^{-1}$ to 2000 $cm^{-1}$). A conventional infrared spectrophotometer, either an FT-IR (Fourier transform infrared) spectrometer or a dispersive infrared spectrophotometer, may be employed. For high spatial resolution measurements, such as for variation of OH concentration, additional equipment may be used as is known in the art.

The OH group has characteristic absorption bands near 2.72 μm (3676 $cm^{-1}$), 2.21 μm (4525 $cm^{-1}$) and 1.38 μm (7246 $cm^{-1}$) in fused silica. The $H_2$ species has an absorption band at 2.38 μm (4135 $cm^{-1}$) in fused silica.

The parameter β-OH is defined as the relative linear absorption coefficient of hydroxyl (OH) in a glass matrix, or the absorption per unit pathlength. It is calculated using the following equation:

$$\beta - OH = \frac{1}{t} \log \frac{T_{ref}}{T_{OH}}$$

where: $T_{ref}$=Transmittance of sample at reference position, a non-absorbing wavelength such as 4000 $cm^{-1}$, $T_{OH}$=Transmittance of sample at OH absorption peak (~3676 $cm^{-1}$ for silica) and t=Thickness of sample (mm). This value is linearly proportional to the hydroxyl concentration.

The OH concentration, c, in mol·liter-1, is derived from the Beers-Lambert Law $$A = \epsilon \cdot c \cdot b$$

where the absorbance $A=\log(T_{ref}/T_{OH})$, ε is the molar absorptivity in liter·$mol^{-1}$ ·$cm^{-1}$, c is concentration in mol·$liter^{-1}$, and b is the pathlength (sample thickness) in cm.

$$c(\text{mol·liter}^{-1}) = A/(\epsilon \cdot b)$$

Concentration of OH in ppm by weight can thus be calculated from c in mol·liter−1 using the density of the glass and molecular weight data of OH. The constant ε for high purity silica glass at a particular wavelength is available in the prior art.

Fictive temperature is a temperature at which a frozen-in glass structure would be at equilibrium. The Si—O—Si bond angle is a function of fictive temperature. The infrared absorption wavelength, or frequency, of Si—O—Si species varies with bond angle. Thus infrared absorption can be used to determine an approximate fictive temperature. An empirical relation between fictive temperature and absorption frequency is given in the prior art such as Agarwal et al. *A simple IR spectroscopic method for determining fictive temperature of silica glasses*, Journal of Non-crystalline Solids 185 (1995) 191. Raman scattering can also be used to determine fictive temperature using the scattering frequency of silica defects related to strained ring structure.

The preferred method for determination of interstitial molecular $H_2$ in fused silica is Raman scattering. Raman spectrometry is obtained using a T64000 spectrometer from HORIBA Jobin Yvon Inc. with an EEV charge-coupled device (CCD) detector. The hydrogen molecule concentration in molecules/cm$^3$ was obtained from the ratio of the intensity detected from the hydrogen molecule scattering peak at 4135 cm$^{-i}$ ($I_{4135}$) to the intensity of the silica scattering peak at 800 cm$^{-1}$ ($I_{800}$), i.e. $I_{4135}/I_{800}$, in the laser Raman spectrum (See, V. S. Khotimchenkô et al, Prikladnoi Spektroskopii, 46 (6), 987-997 (1986)). More specifically, the intensities of the peaks were determined by integrating the areas under the peaks using a linear or quadratic fit to the background. It should be noted that in the present method, the limit of detection was $1 \times 10^{16}$ molecules/cm$^3$.

Absolute β-OH values are obtained by the FTIR method described above. The measurements are typically through very thin pieces of glass of about 1 mm thickness. The variation of OH concentration means the differences in values of OH concentration measured in a certain direction in a cross-section. Similar to the definition of refractive index variation above, when discussing variation of OH concentration along a certain direction, linear changes are subtracted. Variation of OH concentration in the present application is defined as the maximal deviation of the measured data from a linear fit curve of the data. For a cylindrical glass prepared by using the OVD process, calculation of variation of OH concentration in the radial direction can be approximately illustrated as follows. The sample for measurement of OH concentration is schematically illustrated as 103 in FIG. 1.

For a data set containing N data points, such that at any radial location, $r_i$, the hydroxyl concentration is given by $OH_i$, where $i=1, 2, 3, \ldots, N-1, N$. The data set can be fitted to a linear function of the form:

$$(OH)_{fit,i} = mr_i + c \quad [1]$$

where parameters m and c are estimated using the following relations:

$$m = \frac{\left[ \sum_{i=1}^{N} OH_i \sum_{i=1}^{N} r_i - N \sum_{i=1}^{N} OH_i r_i \right]}{\left[ \left( \sum_{i=1}^{N} r_i \right)^2 - N \sum_{i=1}^{N} r_i^2 \right]} \quad [2]$$

$$c = \frac{\left[ \sum_{i=1}^{N} OH_i - m \sum_{i=1}^{N} r_i \right]}{N} \quad [3]$$

The above relation (least-square fitting) are then used to estimate the maximum deviation of the data from the linear fit curve using the following relation:

$$(\Delta OH)_{max} = \max[abs(OH_i - mr_i - c)] \text{ for } i=1, 2, 3, \ldots, N \quad [4]$$

For any glass blank, the same method of calculating OH concentration variation along a given direction in a cross-section perpendicular to the optical axis of a glass sample can be used mutatis mutandis. Still take sample 103 in FIG. 1 for example, the OH concentration variation as a function of the x coordinates (along the direction of axis x) in the cross-section parallel to the plane xOy can be calculated using the above least-square fitting of measured OH concentration data. Desirably, along directions of both axes x and y, the OH concentration variation, measured separately, is less than 20 ppm, preferably less than 10 ppm, still more preferably less than 5 ppm, still more preferably less than 3 ppm, most preferably less than 1 ppm.

The variation of fictive temperature of the glass material, or a blank or an optical member made therefrom, is the variation between the values measured throughout the bulk of the material.

Concentrations of Cl and F in the present invention are measured using the conventional microprobe technology available in the art. Concentrations of Na, K, and other metals in the present invention are measured using the conventional ICP/MS technology available in the art. The concentrations of Cl and fluorine are typically discussed in terms of ppm by weight. Concentrations of metals are usually described in terms of ppb by weight.

In the present application, $O_2/H_2O$ or $H_2O/O_2$ means $O_2$ or $H_2O$, or mixtures of different proportions thereof.

Local soot density as used herein denotes the bulk density of the soot preform in a small confined volume in a given area in the soot preform. The denser the soot particles are packed in a given small volume, the higher the local density and thus the lower the porosity in the volume. For the purpose of the present invention, a high local soot density uniformity means in a distance over 0.2 mm, the difference between the maximum and minimum local soot density measured in a plane perpendicular to the optical axis of the consolidated glass to be produced is less than 20% of the overall bulk soot density in the soot preform, or less than 0.2 g/cm$^3$, whichever is greater. Preferably, in a distance over 0.2 mm, the difference between the maximum and minimum local soot density is less than 10% of the overall bulk soot density in the soot preform, or less than 0.1 g/cm$^3$, whichever is greater. More preferably, in a distance over 0.2 mm, the difference between the maximum and minimum local soot density is less than 10% of the overall bulk soot density in the soot preform.

Laser-induced changes of optical behavior of high purity fused silica material have been extensively studied. Without intending to be bound by any particular theory, it is believed that the following photo-reactions may take place within the silica material when subjected to high energy photons such as those of KrF (248 nm) and ArF (193 nm) high-power pulsed laser:

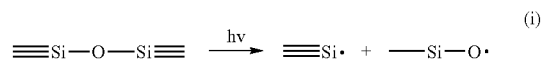

(i)

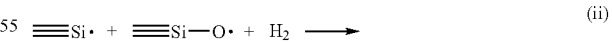

(ii)

(iii)

(iv)

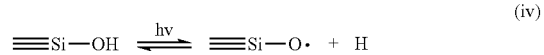

In the above schematic illustrations of reactions, ≡Si—O. and ≡Si. are color centers. ≡Si. has an absorption peak at about 215 and thus is relevant to laser-induced absorption at 193 nm. It is believed that these reactions may lead to the induced absorption (transmission loss), density change, refractive index change (photorefraction), as well as stress-birefringence. The induced density change and refractive index change in combination contribute to the laser induced wave-front distortion (LIWFD). Such LIWFD can be wave-front retardation (expansion) and/or advancement (compaction). It has been observed that LIWFD is dependent upon the fluence and pulse number of the laser radiation. For the manufacturers of high precision optical systems, such as stepper lenses and UV scanners, such compaction and/or expansion, especially if non-linear or unpredictable, and laser induced transmission loss, are highly undesirable.

To date, two major processes are used for the production of high purity synthetic fused silica materials for use in optical applications. They are the soot-to-glass process and the direct-to-glass process. In the soot-to-glass process, silica soot particles are generated in a furnace and allowed to deposit on a rotating surface by, for example, outside vapor deposition (OVD) or vapor axial deposition (VAD), and the like, to form a porous soot preform. The soot preform is subsequently consolidated at a sintering temperature to form transparent consolidated high purity fused silica material. This method has been used widely in the production of optical fiber preforms. The direct-to-glass method usually involves forming silica soot particles at a temperature higher than that of the soot-to-glass method by flame hydrolysis and the like, and the soot particles are deposited onto the surface of a rotating table at such a high temperature (about 1650° C., for example) that they are consolidated into fused silica material in situ, usually in the same furnace where the soot particles are generated.

One of the advantages of the direct-to-glass process is the possibility of producing large fused silica boules at relatively high homogeneity, making it possible to make large blanks for use in large optical systems, such as stepper lenses. Due to difficulty in altering the many important, oftentimes intertwined process variables in the direct-to-glass method in order to produce a boule having desired composition and optical properties, attention now has been directed to the production of high purity synthetic silica glass by using the soot-to-glass materials, where the process conditions may be purposefully adjusted to alter the property of the final product.

Soot-to-glass methods for producing high purity synthetic fused silica materials have been described in the prior art before. For example, United States Patent Application Publication No. 2003/0115905 discloses a fused silica blank having an $H_2$ content in the range of $0.1 \times 10^6$ to $4.0 \times 10^{16}$ molecules/cm$^3$, an OH content in the range of 125 to 450 ppm by weight, an SiH group content of less than $5 \times 10^{16}$ molecules/cm$^3$, and a refractive index inhomogeneity of less than 2 ppm. It is disclosed in this reference that the soot-to-glass method was at least partly employed. However, it is clear from this reference that, in order to obtain the intended product, a post-sintering homogenization treatment is necessary. The homogenization treatment requires twisting and turning of the consolidated glass at a very high temperature, up to and exceeding 2000° C., in special homogenization equipment. Such twisting and turning is described, for example, in European Patent Application Publication No. EP-A1 673 888. Therefore, it is clear that the silica glass prepared immediately after sintering but before the homogenization treatment according to United States Patent Application Publication No. 2003/0115905 does not have the required compositional and/or refractive index homogeneity required for many intended applications. However, as mentioned above, such high-temperature twisting and turning require the use of specialty equipment, and are very complex and costly to operate.

Surprisingly, the present inventors have produced high purity synthetic fused silica materials by using the soot-to-glass method without the need of a post-sintering homogenization treatment of the consolidated glass. The synthetic silica glass has the compositional and property, especially refractive index, homogeneity requirements in planes perpendicular to the optical axis of the glass. The synthetic silica glass material per se constitutes a first aspect of the present invention. The silica glass of the present invention features a OH concentration variation of less than 20 ppm, preferably less than 10 ppm, most preferably less than 5 ppm measured in a plane perpendicular to the optical axis of the material. The glass may be further doped with chlorine, fluorine, and other dopants. Desirably, such other dopants are substantially homogeneously distributed in the same plane in which OH concentration variation meets the requirement described above. As a result of the compositional uniformity in such plane, the glass of the present invention has high refractive index homogeneity in the same plane. Desirably, Δn in the same plane is less than 5 ppm, preferably less than 2 ppm, more preferably less than 1 ppm.

Because the presence of $H_2$ in proper amounts can function to inhibit the formation of oxygen-deficient centers in the glass and reduce the laser induced absorption and LIWFD, in some embodiments of the glass of the present invention, the silica glass comprises $H_2$ in the amount between $1 \times 10^{15}$ to $5 \times 10^{18}$ molecules/cm$^3$.

The presence of chlorine, alkali metals, alkaline earth metals and transition metals all lead to transmission loss at 193 nm. Therefore, it is desired that chlorine level in the glass is controlled below 50 ppm, and the amount of alkali, alkaline earth and transition metals are all controlled at lower than 10 ppb, preferably lower than 1 ppb.

In order to reduce Rayleigh scattering, birefringence and index homogeneity further at 193 nm inside the glass, it is desired that the glass material of the present invention has a low fictive temperature of between 800-1200° C. It is also desired that the glass of the present invention has a variation of fictive temperature less than 50° C., preferably less than 10° C., in order to minimize localized density fluctuations in the glass.

A second aspect of the present invention is an optical glass member made of the silica glass material of the present invention having an optical axis parallel to the axis of the material of the present invention, in a plane perpendicular to which the OH concentration variation is less than 20 ppm by weight. Desirably, the optical glass member of the present invention has an internal transmission at 193 nm of higher than 99.65%/cm, preferably higher than 99.70%/cm, more preferably higher than 99.75%/cm, most preferably higher than 99.80%/cm.

A third aspect of the present invention is directed to the novel soot-to-glass method. In step (i) of the process, the soot particles are typically provided by a flame hydrolysis process of a silicon precursor compound. The silicon precursor compound, such as $SiCl_4$ and organosilicon compounds, for example, OMCTS (octamethylcyclotetrasiloxane) and the like, may be introduced into a flame of hydrogen, $CH_4$, and the like, burning with $O_2$, whereby silica soot is formed. Step (i) may be plasma-assisted. In step (ii), the silica soot may be deposited to form a porous body onto a supporting core cane or a mandrel, such as those in a typical outside vapor deposition (OVD) or a vapor axial deposition (VAD) process. If a mandrel is used, it is usually removed after deposition to result in a hollow cylindrical shaped porous soot body before the consolidation in step (iv). The porous soot body may be consolidated as is in step (iv) or with optional prior purification. Alternatively, the soot preform may be formed in accordance with the teaching of U.S. Pat. No. 6,606,883 to Hrdina et al. entitled "Method for Producing Fused Silica and Doped Fused Silica Glass," the content of which is relied upon and incorporated herein by reference in its entirety. According to this patent reference, flat, porous silica soot preforms can be formed by depositing silica soot particles on a planar surface. This preform deposition method is hereinafter referred to as "planar deposition" in the present application. Advantageously, the planar deposition surface rotates and oscillates so that a more homogeneous soot preform body can be produced.

Regardless of the deposition method used, it is important that the local soot density of the preform produced in step (ii) is sufficiently homogeneous. As discussed below in connection with the many examples of the present invention and comparative examples, initial local soot density in the preform prior to consolidation is one of the key factors determining the final compositional homogeneity, especially OH concentration homogeneity in the consolidated glass. Therefore, for the present invention, the local soot density variation in a distance over 0.2 mm in the preform is required to be less than 20% of the overall bulk density of the whole soot preform, or less than 0.2 g/cm$^3$, whichever is greater. Preferably, the local soot density variation in a distance over 0.2 mm in the preform is less than 10% of the overall bulk density of the whole soot preform, or less than 0.1 g/cm$^3$, whichever is greater. In order to obtain a high initial local soot density uniformity, one method is to randomize or semi-randomize the oscillation of burners in steps (i) and (ii) of the process of the present invention. This is to be further illustrated below in connection with examples of the present invention and comparative examples. Technique, strategy and equipment that can be used to improve the uniformity of soot deposition are disclosed, for example, in U.S. Pat. No. 5,211,732 to Abbott et al., the content of which is relied upon and incorporated herein by reference in its entirety.

It has been found that abrupt change in the ratio of the flow rates of the precursor compound and O$_2$ supplied via the burner can lead to undesired local soot density variation and striae in the final consolidated glass. Therefore, preferably, in step (i), the silica soot particles are provided by flame hydrolysis of a silicon-containing precursor compound, and in step (ii), the soot preform is formed by depositing the soot particles to a rotating supporting surface, and in steps (i) and (ii), the ratio of the change rates of the flow rates of the precursor compound and O$_2$ provided to the hydrolysis flame via the burner during the initial stage of soot laydown is maintained substantially steady when the flow rates of the precursor compound and O$_2$ increase before they stabilize substantially simultaneously. Usually during the initial stage of soot laydown of a flame hydrolysis process, the flow rates of the silicon precursor compound ("SPC") and O$_2$ increase gradually, ideally nearly linearly over time. The change rates of the flow rates of the silicon precursor compound and O$_2$ can be expressed as follows:

$$CRF_{SPC} = \frac{dF_{SPC}}{dt} \tag{1}$$

$$CRF_{O_2} = \frac{dF_{O_2}}{dt} \tag{2}$$

where $F_{SPC}$ and $F_{O_2}$ are the flow rates of the silicon precursor compound and O$_2$, respectively, t is time, and $CRF_{SPC}$ and $CRF_{O_2}$ are the change rates of the flow rates of the silicon precursor compound and O$_2$, respectively. Thus, the ratio of the change rates ($R_c$) of the flow rates is:

$$R_c = \frac{CRF_{SPC}}{CRF_{O_2}} \tag{3}$$

Therefore, in this preferred embodiment of process of the present invention, $R_c$ is maintained essentially steady during the initial stage of the soot laydown when the flow rates of the silicon precursor compound and O$_2$ increase before they stabilize at essentially the same time. By "essentially steady," it is meant that the variation of $R_c$ is less than 5%, preferably less than 3%, more preferably less than 1%. In another preferred embodiment of the process of the present invention, the ratio of the flow rates of the precursor compound and O$_2$ provided to the hydrolysis flame is maintained substantially steady, which is expressed as follows:

$$\frac{d\frac{F_{SPC}}{F_{O_2}}}{dt} = 0. \tag{4}$$

Figure 12:
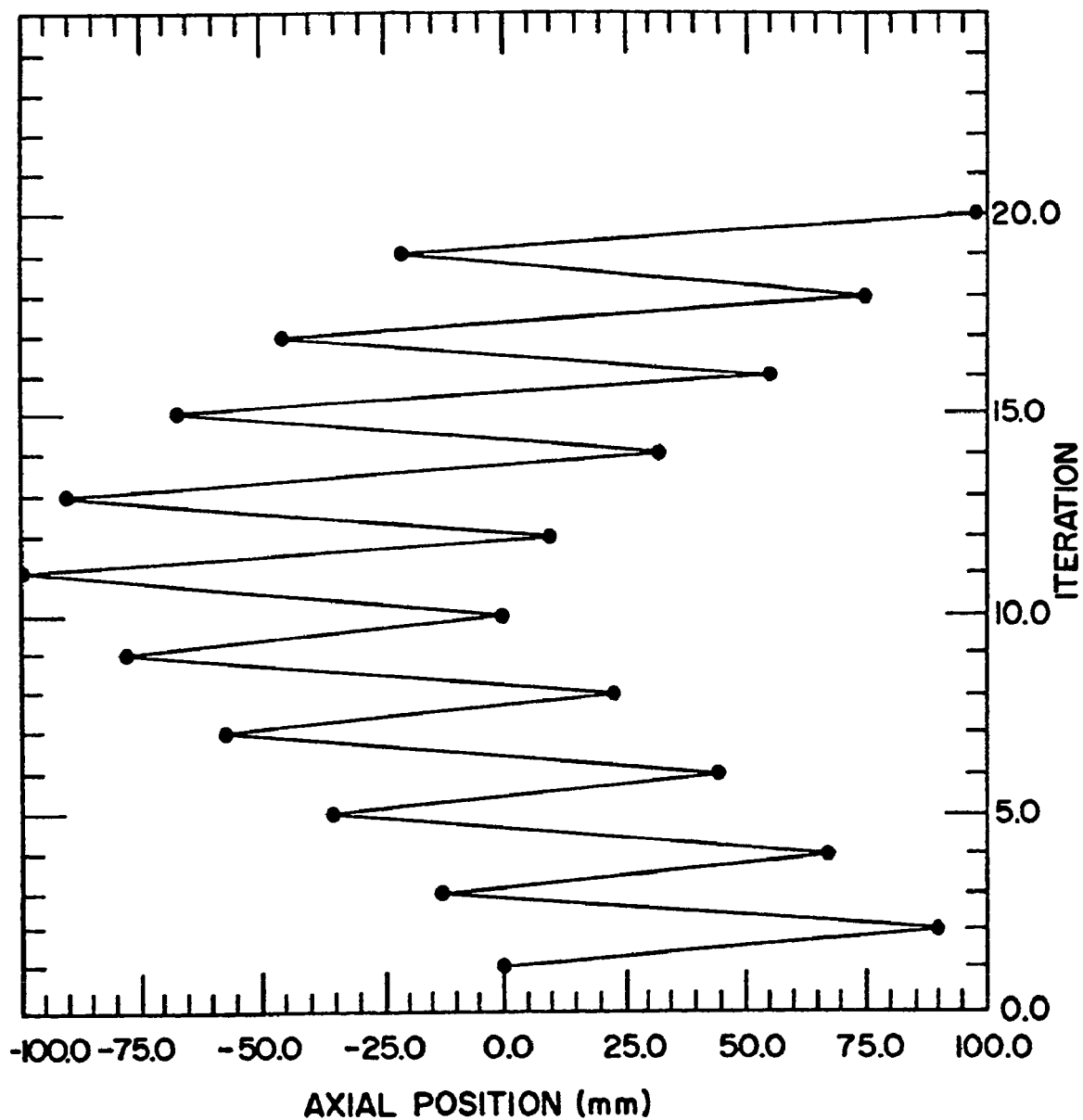
FIG. 12 is a diagram showing the burner oscillation pattern for the Sample No. 11.1 in FIG. 11.
Figure 17:
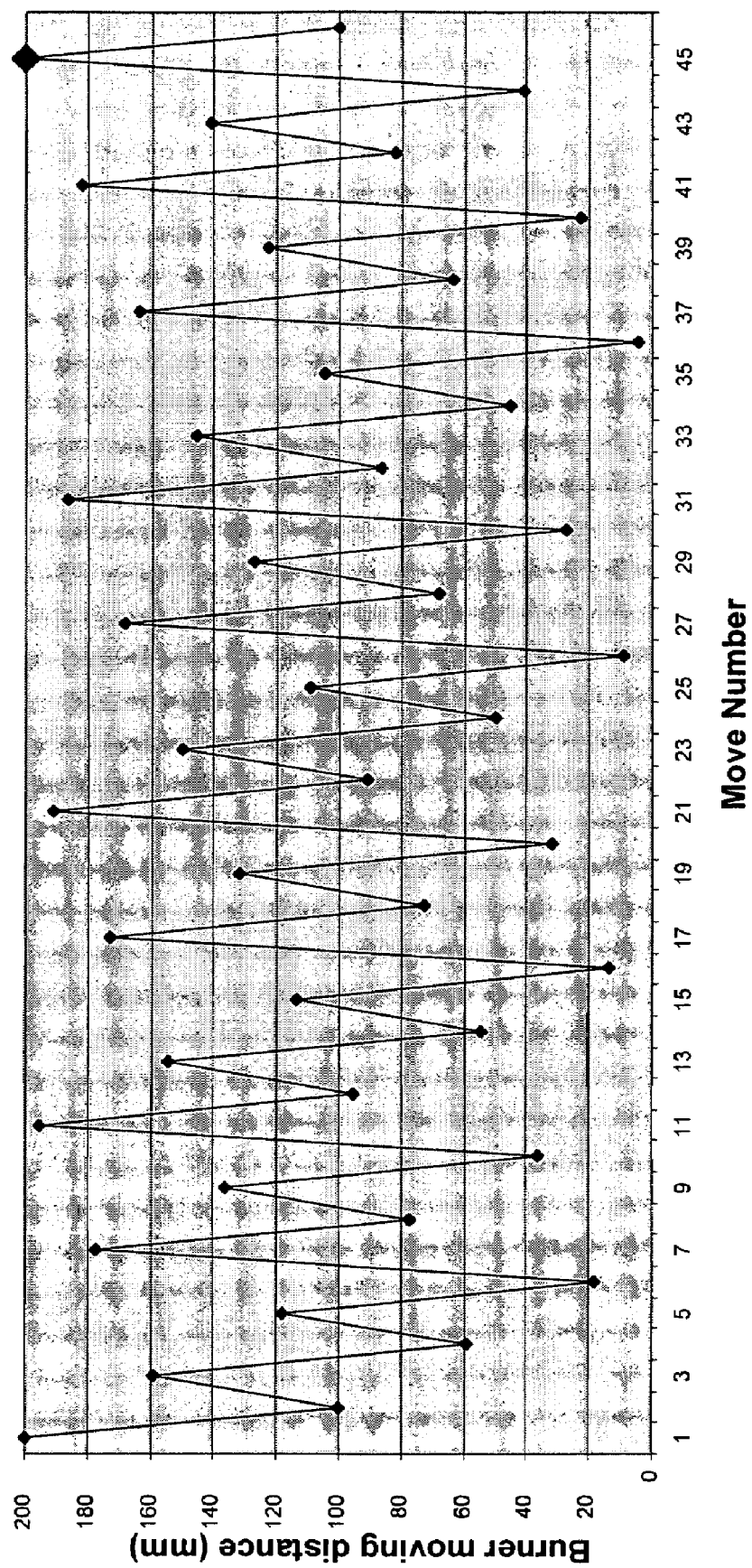
FIG. 17 is a diagram showing a semi-randomized burner oscillation pattern according to the process of the present invention.

In a preferred embodiment, in step (i), the soot particles are provided by flame hydrolysis of a silicon-containing precursor compound through at least one burner, and in step (ii), the soot preform is formed by depositing the soot particles on a rotating supporting surface, wherein the position of the burner oscillates relative to the supporting surface in a pattern such that the soot deposited onto the supporting surface has a high local soot density homogeneity. Preferably, the pattern is semi-randomized or randomized. It has been found that, as described infra in connection with the examples, the burner oscillation as illustrated in FIG. 12 in an OVD process results in undesirable level of local soot density variation. However, a semi-randomized oscillation pattern as illustrated in FIG. 17 results in much better local soot density, hence a better OH concentration homogeneity in the consolidated glass. As used herein in the present application, the term "semi-randomized or randomized pattern" means an oscillation pattern that is sufficiently random such that in a single cycle of the movement of the burner relative to the soot deposition surface (move numbers 1-45 in FIG. 17, for example), the dwell and passing time of the burners at different area of the supporting surface that is significant is essentially uniform.

Purification of the soot preform can be done using methods known in the art, such as chlorine treatment and the like. If the preform is formed by using a chlorine-containing silicon precursor compound, such as SiCl$_4$, or if the preform is purified using chlorine, it may be desired to strip the preform of chlorine before consolidation. Chlorine stripping can be done using various types of gases, including, but not limited to, O$_2$, H$_2$O, fluorine-containing compounds, Br-containing compounds, and the like, and compatible mixtures and combinations thereof.

The consolidation (sintering) step (iv) is usually carried out in the presence of an inert gas, such as helium and/or argon. To obtain silica glass having relatively high OH concentration, for example, over 50 ppm, it is desired to consolidate the soot preform in the presence of H$_2$O. As discussed below, the final OH concentration in the silica glass is partly determined by the partial pressure of $H_2O$ in the consolidation atmosphere. It is not excluded that the consolidation may be carried out in the presence of other gas, such as $H_2$, $O_2$, fluorine-containing compounds, and the like.

After consolidation of the porous glass preform, the condensed glass may be further subjected to treatment in the presence of hydrogen, where $H_2$ molecules are loaded into the glass body to a desired level.

The temperature-temporal profile of the furnace in which the preform is consolidated is critical to the quality of the consolidated glass. The temperature elevation rate is an important process lever for controlling the final compositional profile in the consolidated glass. Generally, consolidating at too low a temperature, such as 1200° C., albeit theoretically possible, is not practical because it takes too long for the glass to completely consolidate. At higher temperature, consolidation is faster. For example, at 1650° C., soot particles produced in the direct-to-glass furnaces are consolidated in situ into fused silica glass. However, as is evident from the discussion below, if the temperature elevation rate is too high during consolidation (sintering), temperature gradient in the glass tends to exist, leading to composition gradient in the soot preform and differing sintering rate in different areas in the preform, which, in turn, causes composition gradient. Compositional gradient usually leads to refractive index variation in the consolidated glass. At a low temperature elevation rate, temperature gradient throughout the soot preform and between the preform and the atmosphere are less likely to occur or are smaller if present, causing the atmosphere to equilibrate with soot particles throughout the preform. This is especially important for an even distribution of $H_2O$ in the soot preform. As discussed below, even distribution of $H_2O$ in the soot preform is important for OH concentration homogeneity in the consolidated glass.

Thus, it has been found desirable to maintain a temperature elevation rate of less than 0.4° C./minute between 1000-1600° C., if the preform is brought to such high temperature up to 1600° C. Preferably, between 1150-1450° C., the temperature elevation rate is maintained at less than 0.2° C./minute. Even more desirably, in order to obtain a high compositional homogeneity in the consolidated glass, the preform is first isothermally held at a temperature between 1150 to 1300° C. for at least one hour prior to final densification. Preferably, the preform is isothermally held at a temperature between 1150 and 1300° C. for more than 5 hours, but less than 200 hours.

Figure 3:
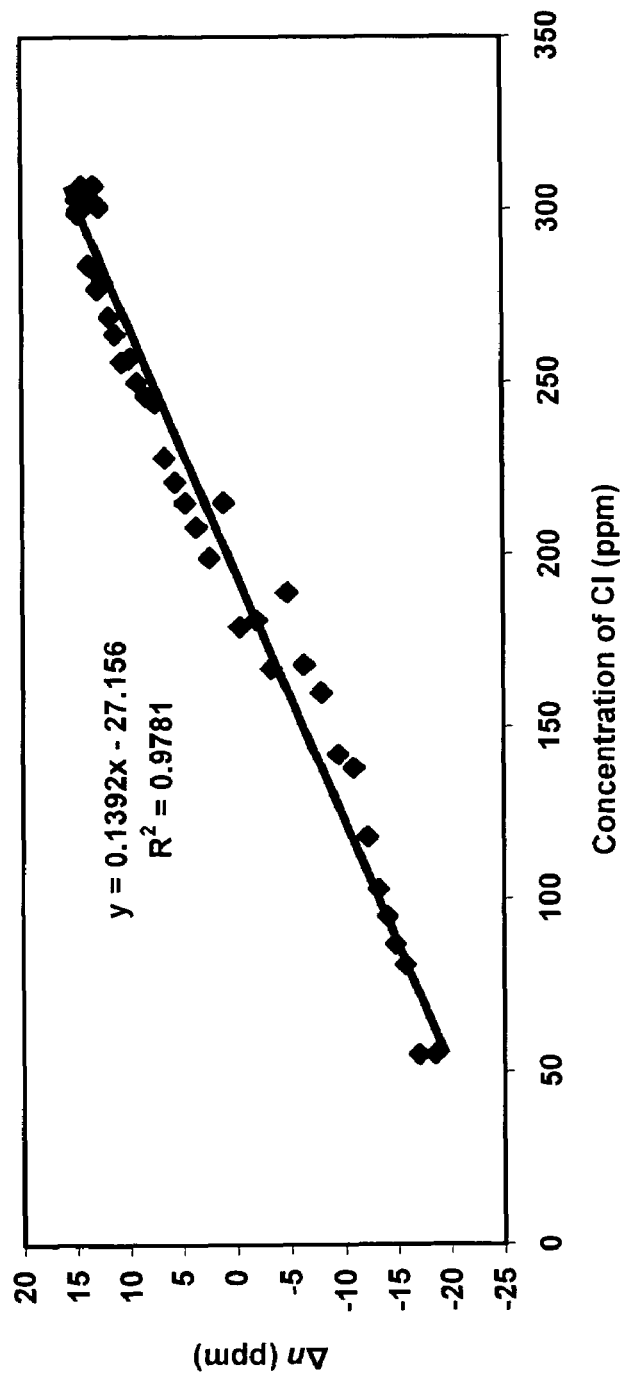
FIG. 3 is a diagram showing the correlation between the chlorine concentration variation and the refractive index variation in the fused silica glass sample of FIG. 2.
Figure 2:
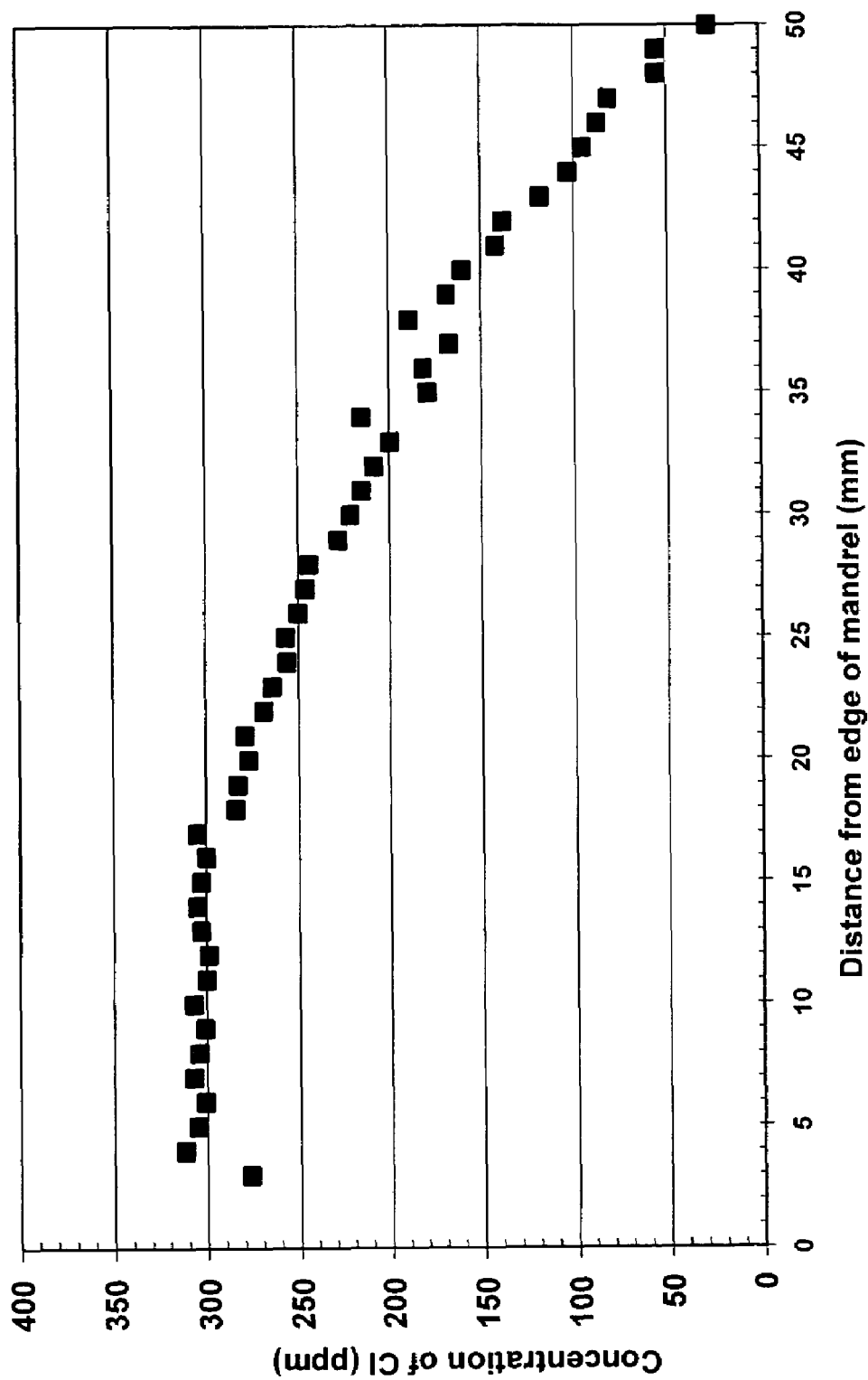
FIG. 2 is a diagram showing the radial chlorine concentration profile of an early fused silica glass sample having less than 10 ppm OH produced using soot-to-glass method.
Figure 4:
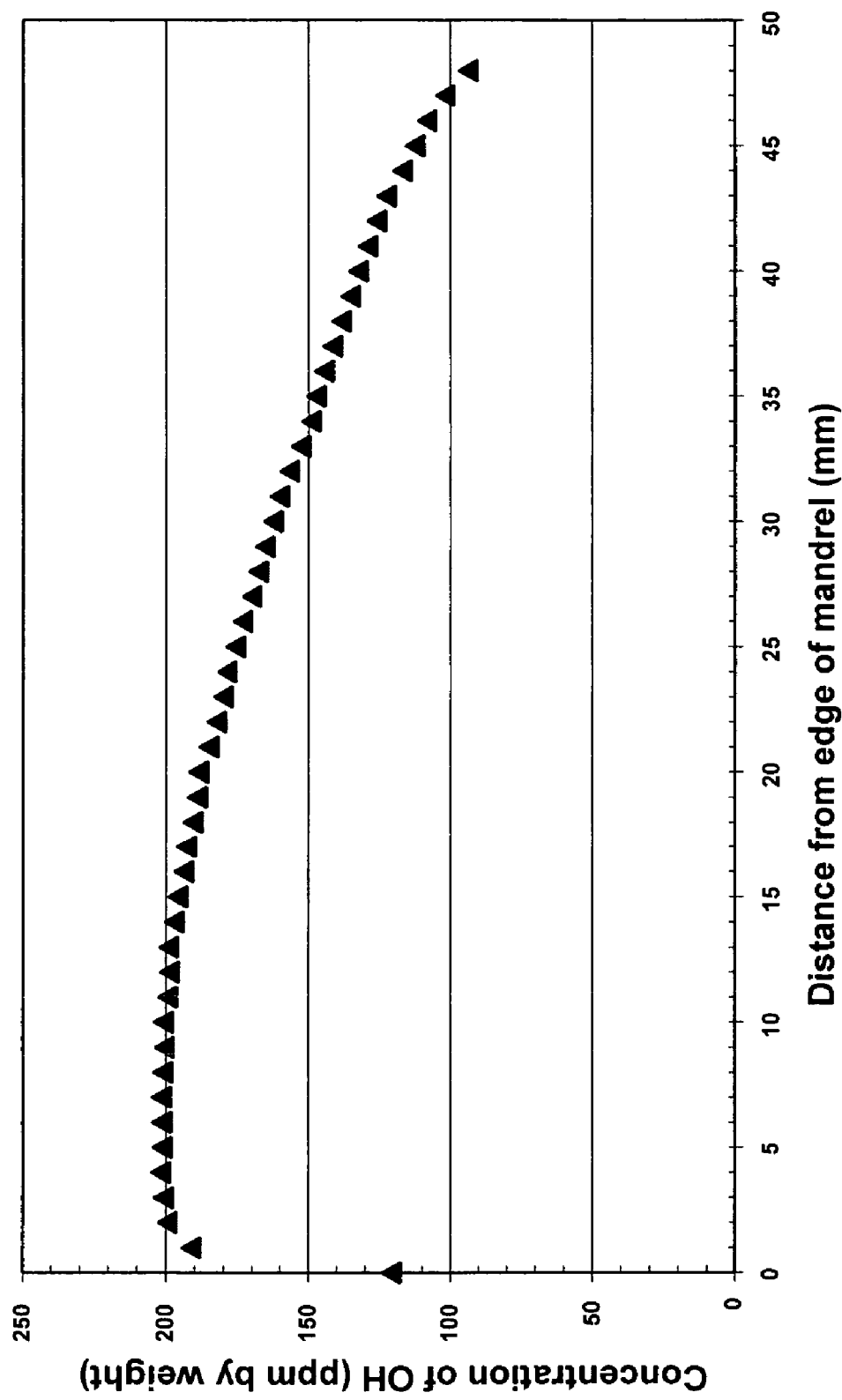
FIG. 4 is a diagram showing the radial OH concentration profile of a fused silica glass sample having less than 5 ppm chlorine produced using soot-to-glass method.
Figure 5:
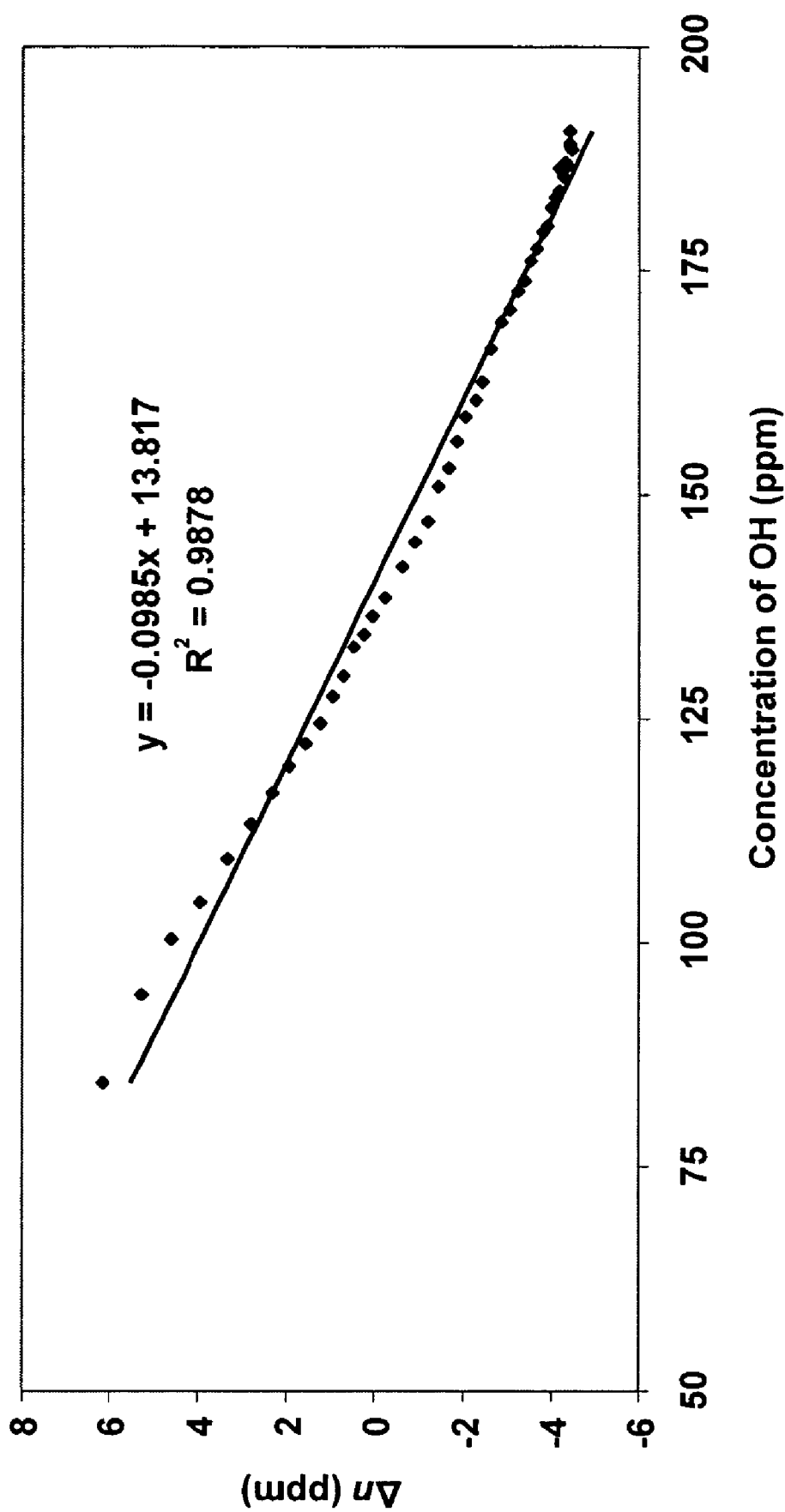
FIG. 5 is a diagram showing the correlation between the OH concentration variation and the refractive index variation in the fused silica glass sample of FIG. 4.

The present inventors have prepared fused silica glass sample materials using the soot-to-glass method without the post-sintering homogenization step. These samples were formed by using outside vapor deposition (OVD) method which has been conventionally used for the production of optical fiber preforms. Therefore, the silica soot particles generated by flame hydrolysis were deposited onto a core glass cane. After deposition, the mandrel was removed to form a porous soot preform, which was subsequently consolidated in a consolidation furnace to fused silica glass having a hollow cylindrical shape. FIG. 2 shows the radial chlorine profile (by microprobe) of one of the samples prepared having less than 10 ppm OH. As is clearly shown in this figure, the longer the distance from the surface of the mandrel, the lower the chlorine concentration in the consolidated glass. FIG. 3 is a diagram showing the correlation between the refractive index change and chlorine concentration measured in a radial cross-section (i.e., a cross-section perpendicular to the axis of the cylindrical shaped preform) of the same sample in FIG. 2. This figure clearly indicates that the refractive index variation is dependent upon the chlorine concentration variation. FIG. 4 shows a radial OH concentration profile (by FT-IR) of another sample having a chlorine concentration less than 5 ppm. In this sample, the further the distance from the surface of the mandrel, the lower the OH concentration in the consolidated glass. FIG. 5 shows the correlation between radial OH concentration and refractive index variation measured in a radial cross-section in the same sample of FIG. 4. It is clear from this figure that the refractive index variation is dependent upon the OH concentration variation. From the study of these samples, the present inventors learned that refractive index homogeneity is highly dependent upon compositional homogeneity. Particularly, in consolidated silica glass having a low chlorine concentration, homogeneity of OH concentration in a cross-section is an important compositional factor determining the refractive index homogeneity.

Water present in fused silica glass is generally in the form of β-OH($\equiv$Si—OH). The present inventors have discovered, by considerable amount of elaborately designed experiments, that by carefully controlling the process conditions in the soot deposition step and preform consolidation step, high OH concentration homogeneity in the consolidated glass can be achieved. The two most important factors determining OH concentration homogeneity in the consolidated glass are local soot density variation in the deposited soot preform and the thermal history in the consolidation step. Generally speaking, high local soot density homogeneity in the soot preform is a necessary condition for obtaining high refractive index homogeneity in the consolidated glass. Slow temperature elevation rate, and, preferably, isothermal treatment of the soot preform during certain temperature zone, during the consolidation step, is conducive to a homogeneous OH concentration in the consolidated glass.

Figure 6:
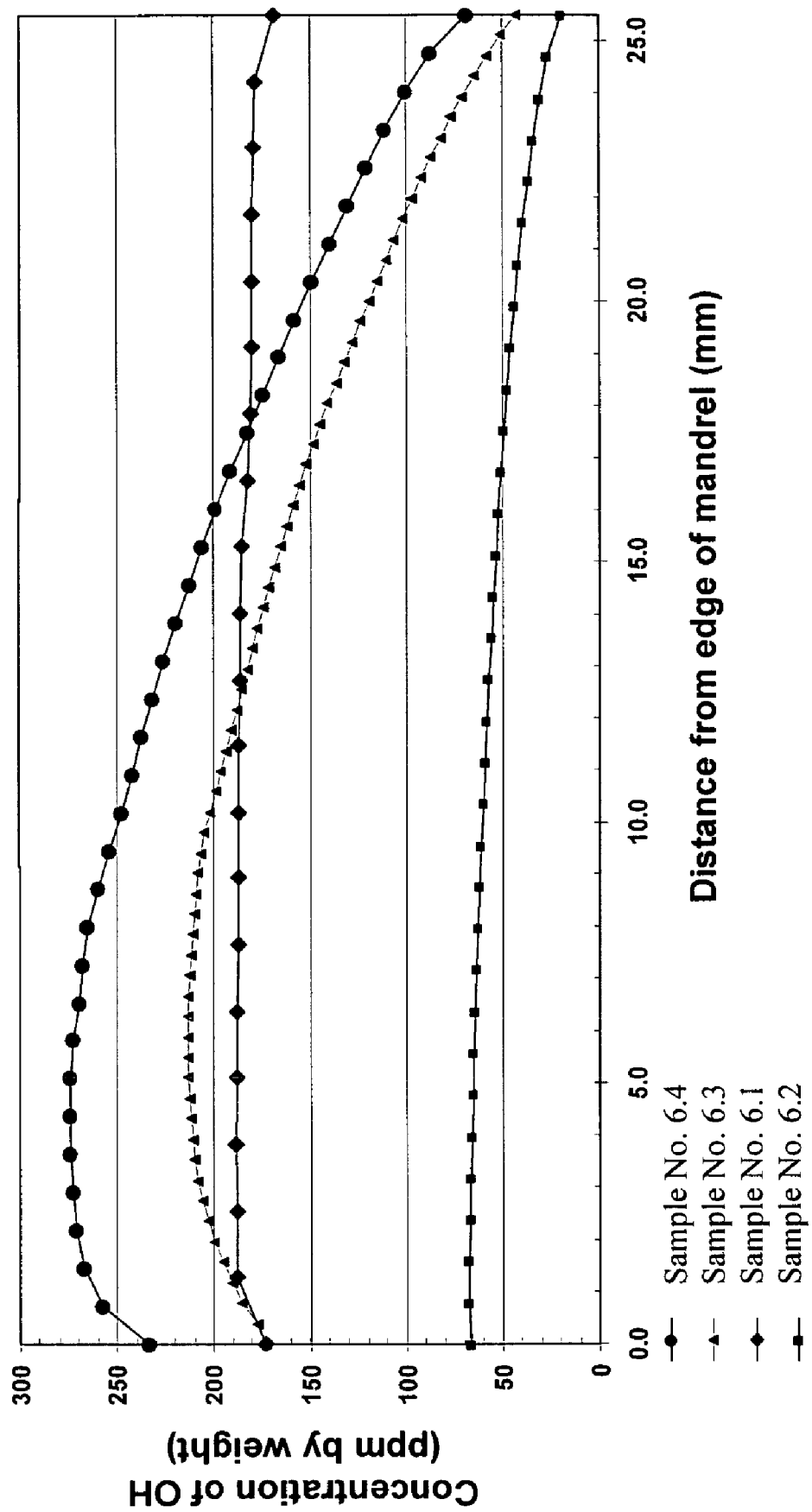
FIG. 6 is a diagram showing the radial OH concentration profiles of four fused silica glass samples produced using soot-to-glass method sintered at various temperature elevation rates.
Figure 7:
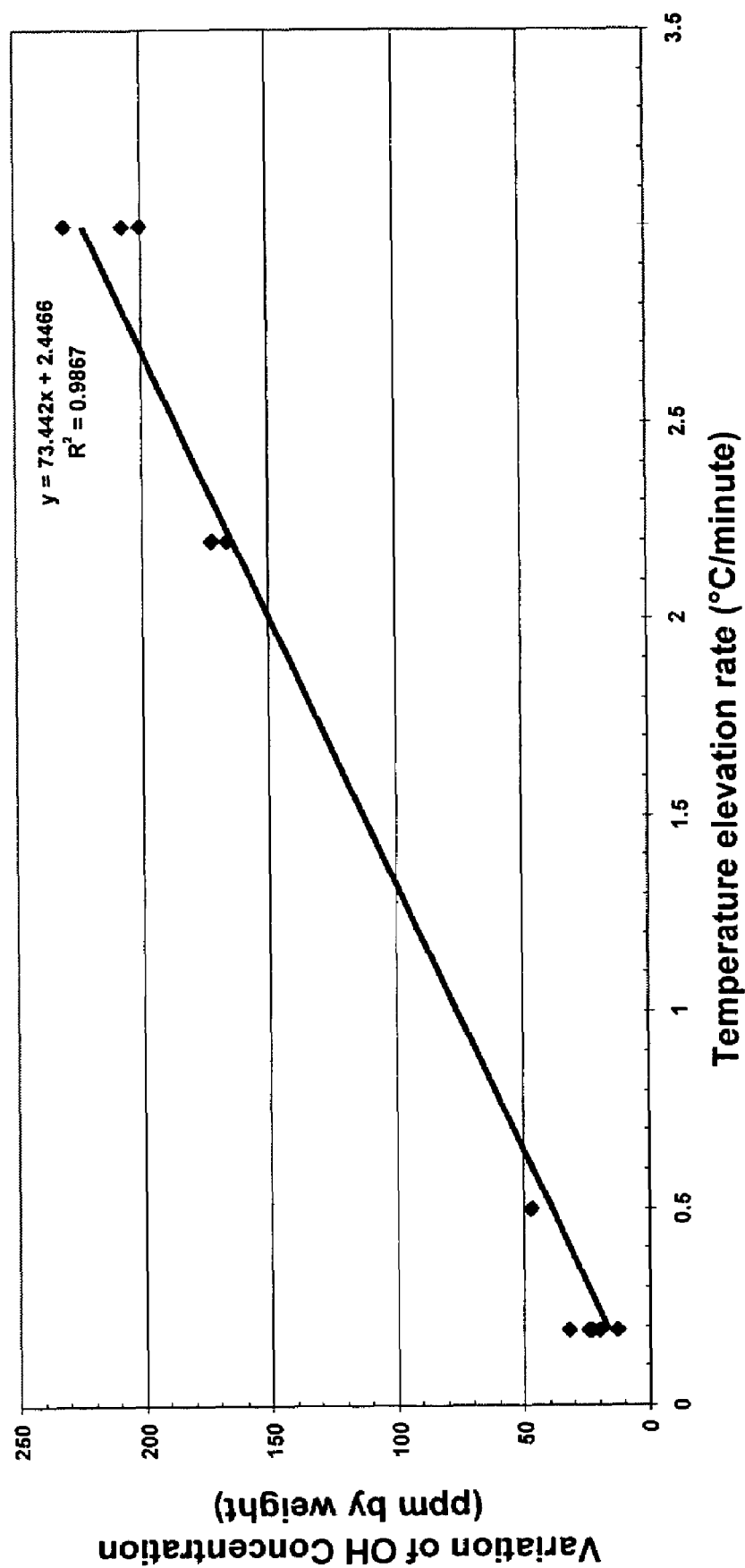
FIG. 7 is a diagram showing the correlation between (a) the OH concentration variation of a plurality of fused silica glass samples produced using soot-to-glass method sintered at various temperature rate and (b) the temperature elevation rate during sintering of such glass samples.

To study the effect of temperature elevation rate on the homogeneity of OH concentration in the consolidated glass, a series of soot preforms were sintered at different rates and the resulting fused silica glasses were measured for OH concentration variation. The preforms where sintered either in helium only or in helium/$H_2O$ mixture atmosphere. FIG. 6 shows the radial OH concentration profile results of four samples (Sample Nos. 6.1, 6.2, 6.3 and 6.4). Sample Nos. 6.1, 6.2, 6.3 and 6.4 were consolidated at 0.19, 0.50, 2.2 and 3.0° C./minute, respectively. From this figure, it is clear that by slowing the temperature elevation rate during sintering, the radial OH concentration across the sample significantly flattened out. FIG. 7 shows the data in FIG. 6 wherein the data is plotted in a different manner. Here, the horizontal axis represents temperature elevation rate during sintering and the vertical axis represents the maximum difference in OH concentration across the radius of the samples. This plot contains data for a plurality of $SiO_2$ soot preform samples that were consolidated under various temperature elevation rates during sintering in helium only or helium/$H_2O$ mixture atmosphere. This plot confirms that temperature elevation rate during sintering is a major process lever in controlling the OH concentration profile (therefore index) across the sample. Though this study is about OH concentration profile only, it is a reasonable inference that other compositional profiles, such as Cl, F, and the like, can be controlled as well by controlling the temperature elevation rate during sintering.

Figure 8:
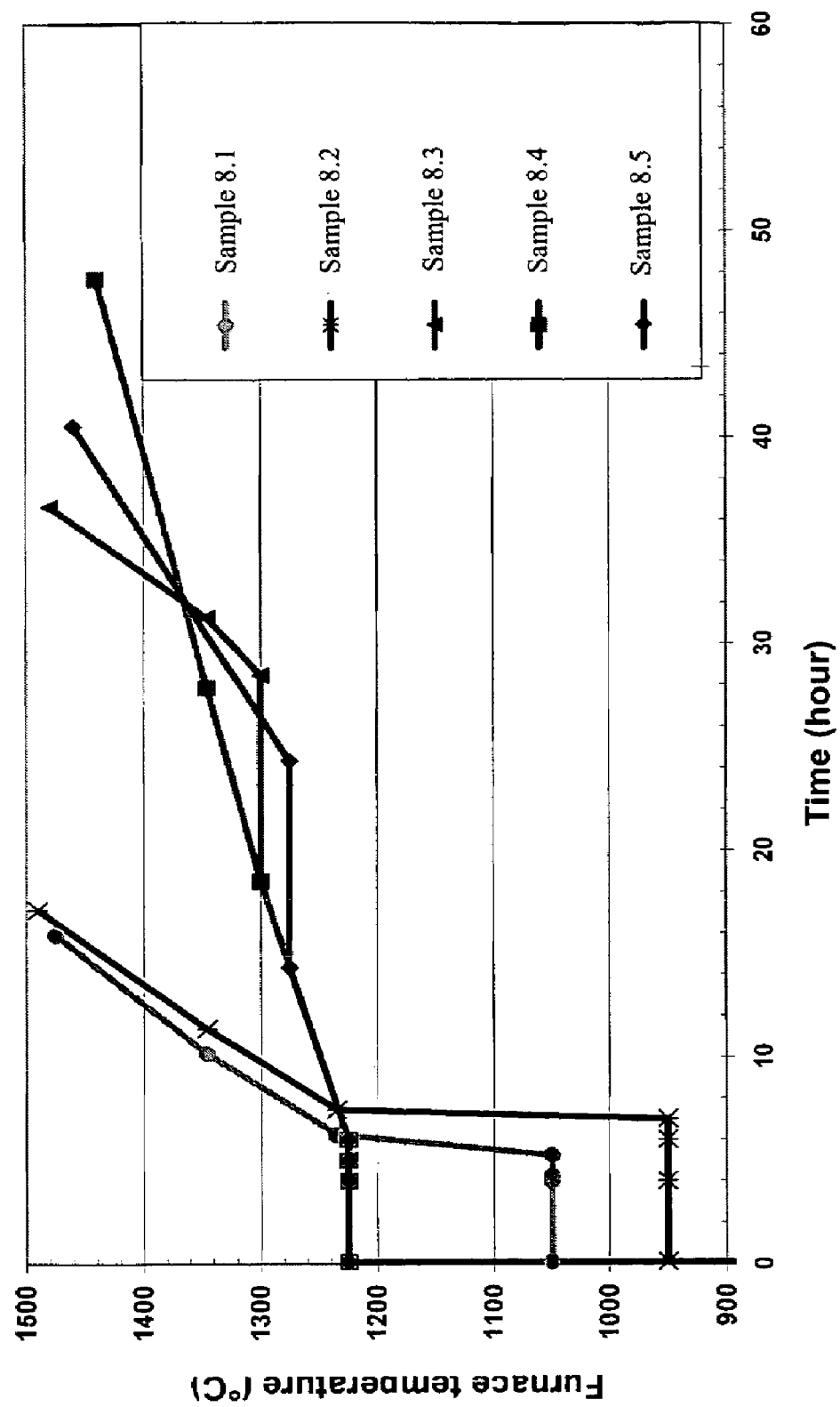
FIG. 8 is a diagram showing the temporal-temperature profiles in the consolidation furnaces in which four silica soot preforms were consolidated.

FIG. 8 shows the time-temperature furnace profile consolidation conditions for five different silica parts (Sample Nos. 8.1, 8.2, 8.3, 8.4 and 8.5). The blanks were sintered in a helium only or helium/$H_2O$ mixture atmosphere. The consolidated glass samples were analyzed by FTIR and the resulting radial OH concentration variation profiles are shown as follows:

Sample No. 8.1: 107 ppm
Sample No. 8.2: 117 ppm
Sample No. 8.3: 58 ppm
Sample No. 8.4: 75 ppm
Sample No. 8.5: 11 ppm.

As with the smaller samples shown in FIGS. 6 and 7, the data here clearly shows that reducing the temperature elevation rate during sintering, especially above 1200° C., improves the radial OH uniformity. In addition, it was discovered that holding the soot at 1300° C. for a period of time further improves the radial uniformity, and this 1300° C. hold appears more critical than slowly ramping beyond 1300° C. Furthermore, it was discovered that an isothermal hold at 1275° C. further improves the radial OH uniformity. Without intending to be bound by any particular theory, it is believed that these improvements are a result of the silica soot reaching uniform temperature and H2O concentrations across the radial distance of the silica part during the critical stages of sintering. It is also expected that, depending on the dopant (OH, Cl, F) concentrations, the optimum temperature profile varies in order that the concentrations of all dopants are homogeneously distributed.

The present inventors also studied the effect of local soot density variation on the radial OH concentration profile in the consolidated glass.

Figure 9:
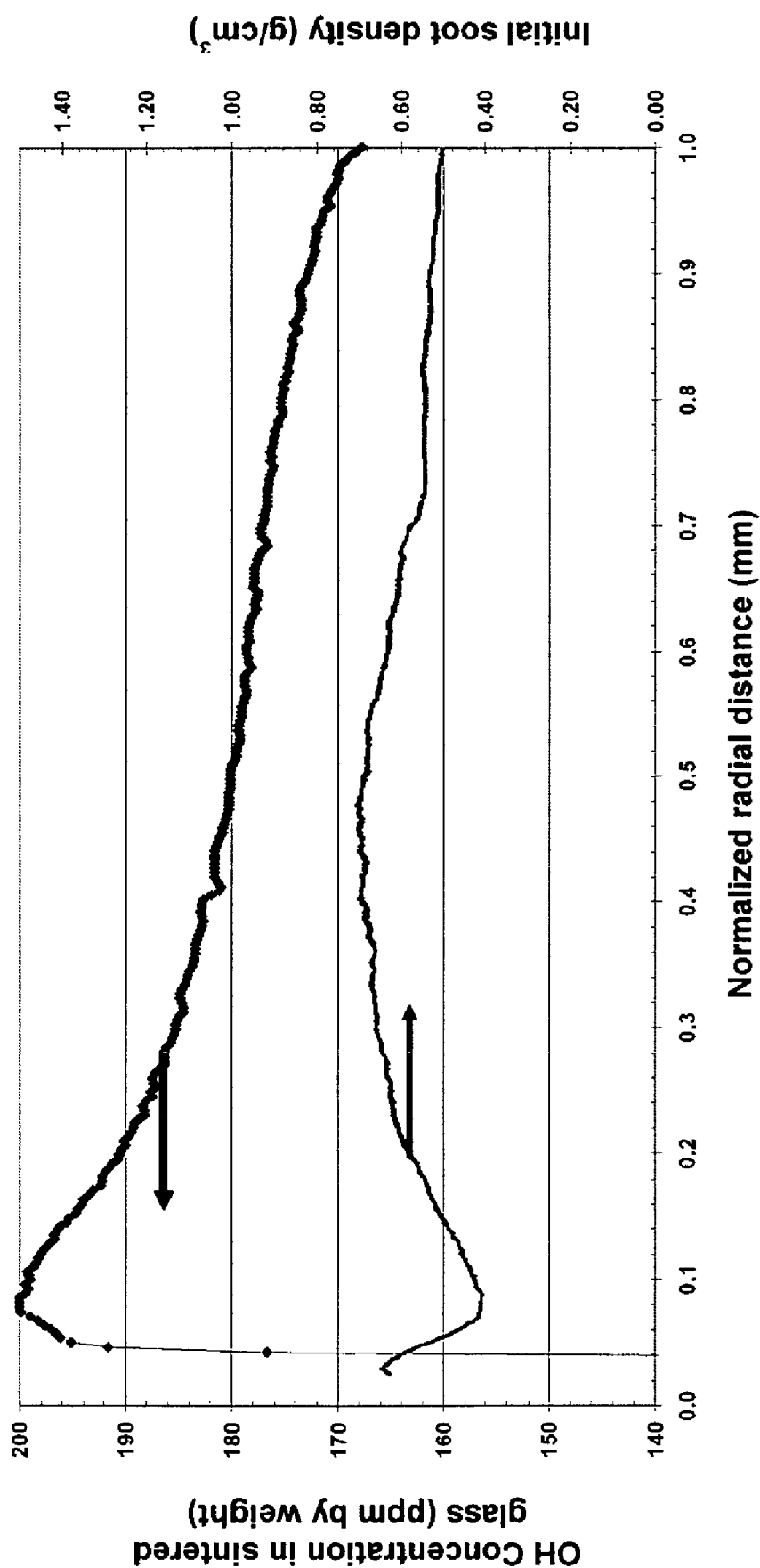
FIG. 9 is a diagram showing the radial OH concentration profile of a consolidated silica glass sample and local soot density profile of the soot preform thereof before sintering.

FIG. 9 shows the radial OH concentration profile and the initial radial soot density results for a soot preform sample sintered at a rate of 0.19° C./minute. The horizontal axis is plotted in normalized radial distance in order to see the direct comparison of OH concentration and initial soot density as a result of $SiO_2$ soot shrinkage during sintering. The initial soot sample was 50 mm thick and the consolidated soot (glass) sample was 27 mm thick. The upper curve is OH concentration curve, and the lower curve shows the local soot density. Starting from the inner edge of the soot preform, the data shows that as the soot density decreases, the resulting OH in the sintered $SiO_2$ glass increases. Then as the soot density increases, the OH concentration profile in the sintered glass is seen to decrease. And as the initial soot density becomes flatter the resulting OH concentration profile in the sintered glass becomes more uniform. The soot density was controlled by changing the $CH_4/O_2/SiCl_4$ (or OMCTS) ratios during $SiO_2$ deposition as well as the residence time that the burner spends at any one point in the process. As is taught in U.S. Pat. No. 5,211,732, longer residence time, higher temperatures of the substrate, and higher $CH_4+O_2/SiCl_4$ (or OMCTS) flows increases the deposited soot density. Without intending to be bound by any particular theory, the present inventors believes this dependency of OH concentration on local soot density is explained by the following: soot density is inversely proportional to soot surface area; OH incorporated into the glass is proportional to the initial soot surface area, as well as the $H_2O$ partial pressure in the consolidation furnace atmosphere. Assuming that $H_2O$ concentration around the soot particles in the soot preform is uniform during sintering and has equilibrated with the $H_2O$ in the sintering atmosphere, at a given $H_2O$ concentration in the sintering atmosphere, the higher the soot surface area (thus the lower local soot density in the preform), the higher concentration of OH to be incorporated in the consolidated glass.

Figure 10:
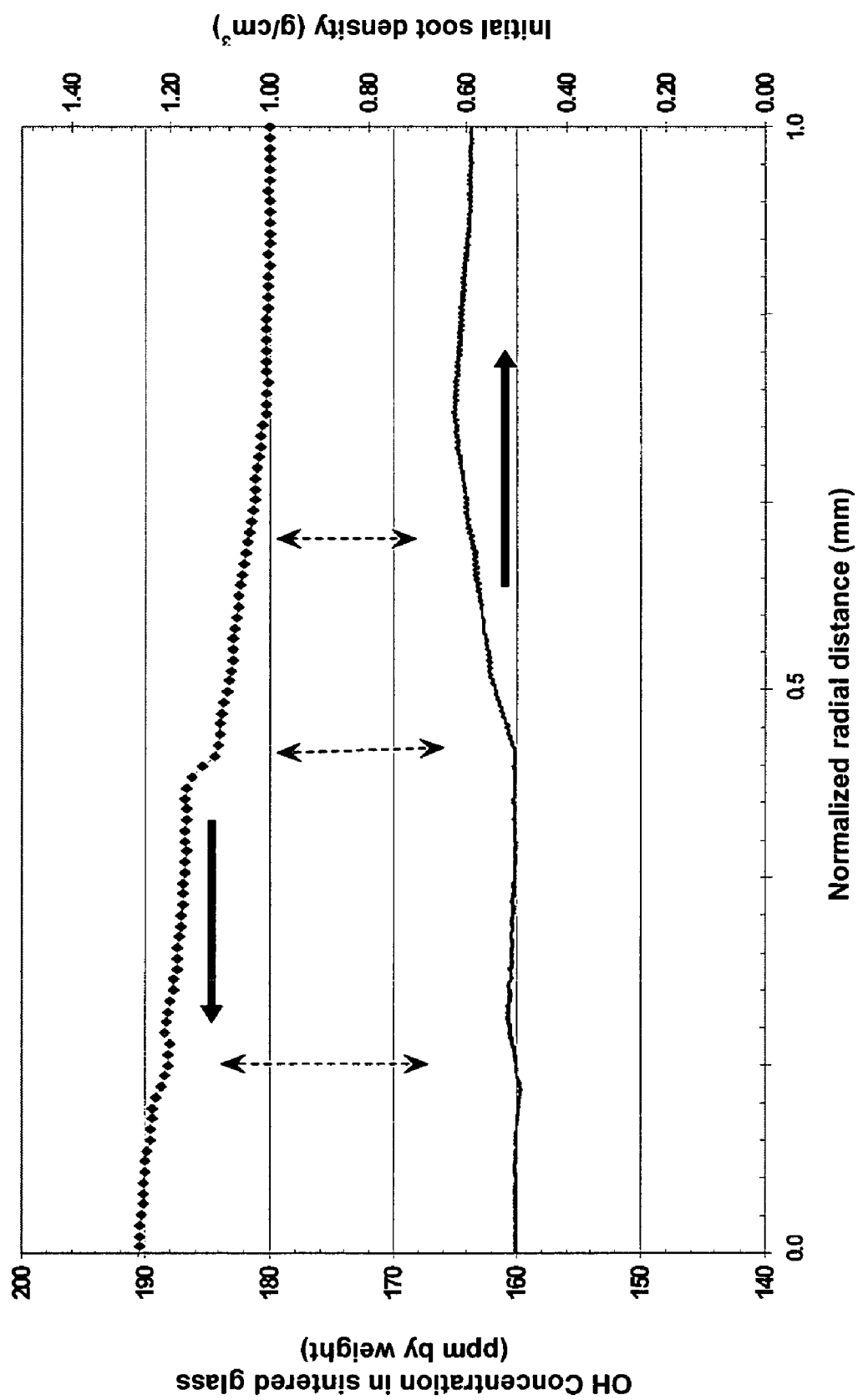
FIG. 10 is a diagram showing the radial OH concentration profile of another consolidated silica glass sample and local soot density profile of the soot preform thereof before sintering.

FIG. 10 shows a similar plot for another silica soot preform sample sintered at a temperature elevation rate of 0.19° C./minute. Starting at the zero normalized radial distance (inside of sample), the initial soot density appears fairly flat and the corresponding OH concentration profile is also fairly flat. When the soot density sharply increases, the resulting OH concentration profile is seen to drop, and conversely, when the soot density decreases the corresponding OH concentration profile increases. See the dotted arrows in FIG. 10. Note that the OH concentration profile is flattest when the soot density has a slightly decreasing radial slope. Without intending to be bound by any particular theory, it is believed this is due to the $SiO_2$ soot being sintered at non-equilibrium conditions, i.e., still too rapidly. Therefore, in order to obtain the flattest OH concentration profile, the initial uniformity of the soot density should be as flat as possible along with a uniform sintering rate across the sample. Another possibility is that a slightly decreasing radial density soot profile can compensate for faster sintering rates; this can be seen in the outer most 25% portion of FIG. 10.

Figure 11:
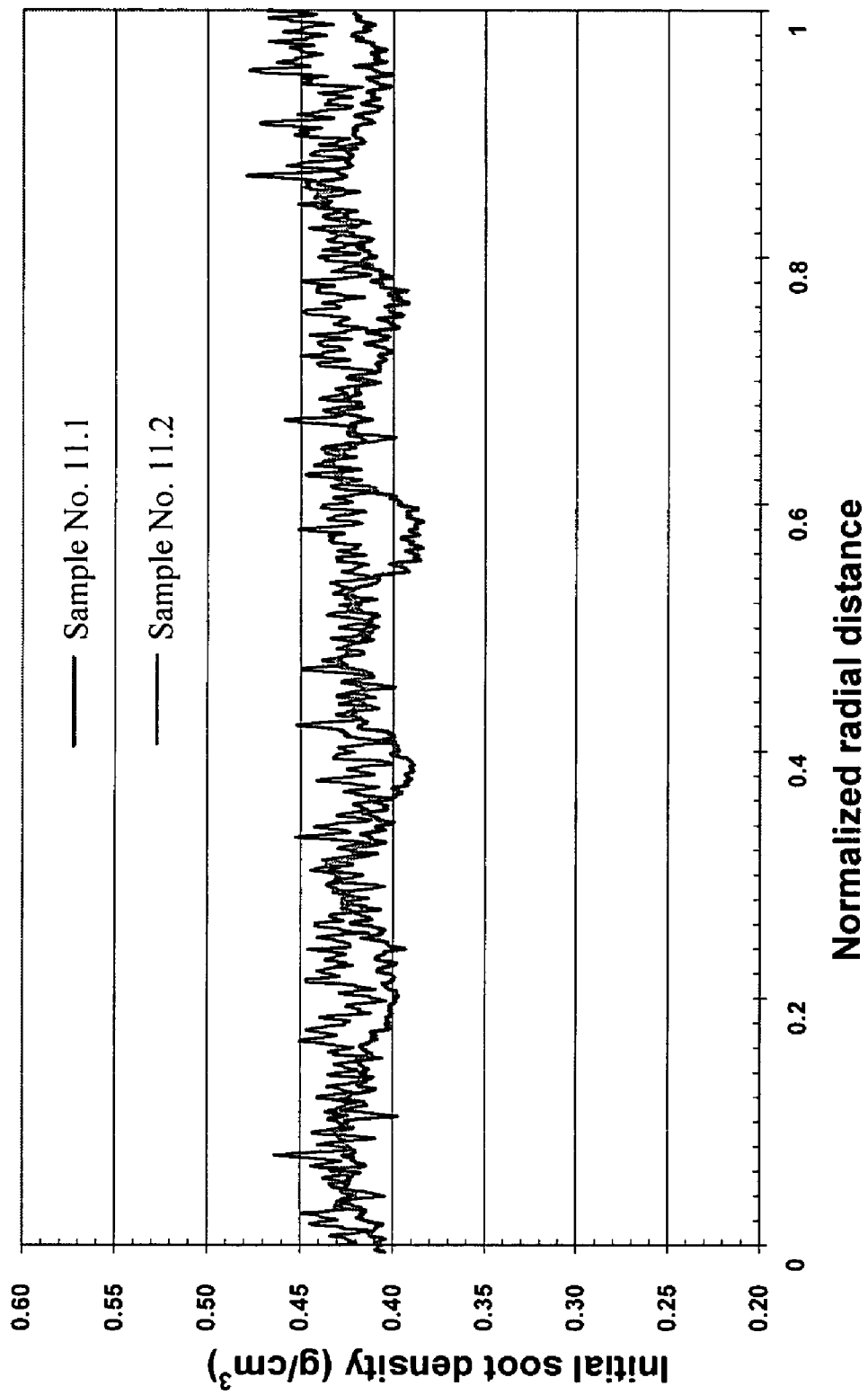
FIG. 11 is a diagram showing the radial local density profiles of two silica soot preforms produced using different burner oscillation patterns.
Figure 13:
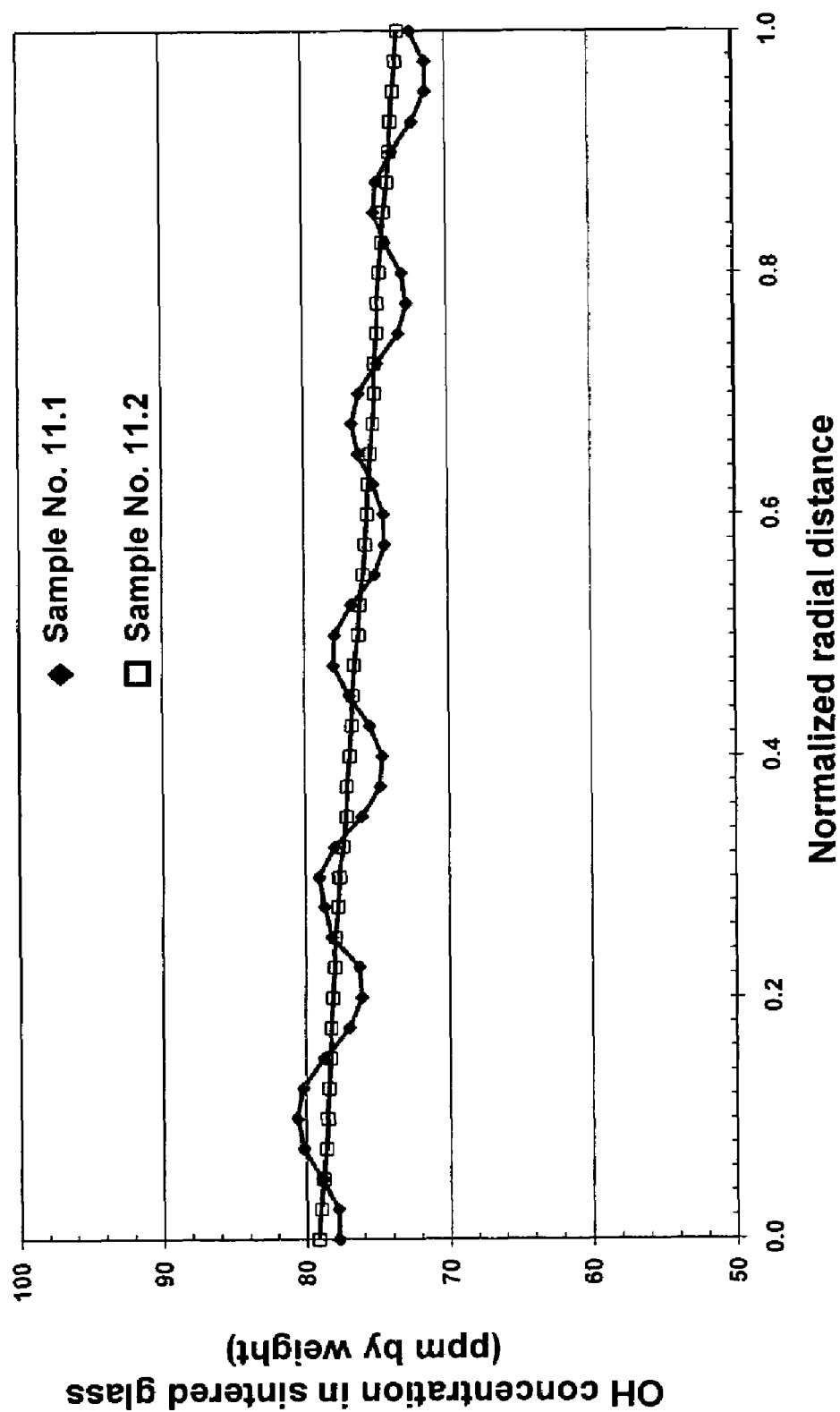
FIG. 13 is a diagram showing the OH concentration profiles of the consolidated glass samples of the two soot preforms of Sample Nos. 11.1 and 11.2 shown in FIG. 11.

FIG. 11 shows a soot density plot for a third (Sample No. 11.1) and forth (Sample No. 11.2) silica samples. The standard control (Sample No. 11.1) is seen to have a periodic oscillation pattern in density. This periodicity is a result of the soot laydown step wherein the burner heats up the soot/substrate non-uniformly during soot deposition due to the burner oscillation pattern as shown in FIG. 12 (again, see U.S. Pat. No. 5,211,732). This type of periodicity of the burner pattern was done for ease of computer programming for the soot deposition process. When the bulk soot density sharply increases, the resulting OH concentration profile in this consolidated soot is seen to drop (FIG. 13), and conversely, when the soot density decreases the corresponding OH concentration profile increases. To solve this problem, the burner oscillation pattern for Sample No. 11.2 was semi-randomized. The soot density results are shown in FIG. 11 and were found to be much more random. This more uniform bulk soot density led to a much more uniform OH concentration profile in the consolidated glass seen in FIG. 13.

Figure 14:
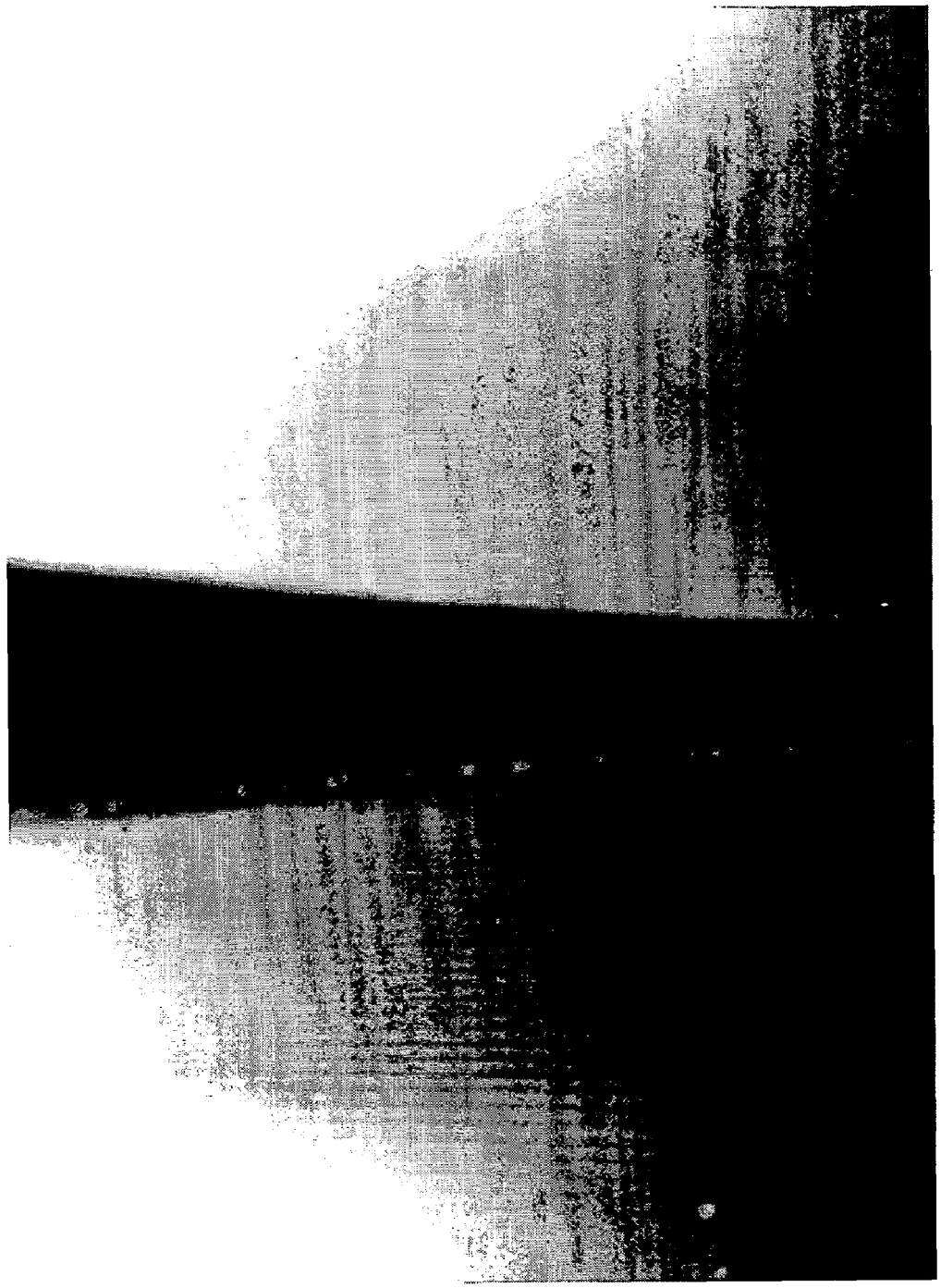
FIG. 14 is a photograph comparing 1 mm thick cross-sectioned radial slices of partially sintered soot and sintering front of two samples produced using different burner oscillation patterns.

FIG. 14 shows photographs of 1 mm thick cross-sectioned radial slice of partially sintered soot and sintering front. Sample on right used standard soot laydown pattern; sample on left used new semi-randomized soot laydown pattern. Semi-randomized oscillation results in better OH uniformity and thus minimization of striae.

Figure 15:
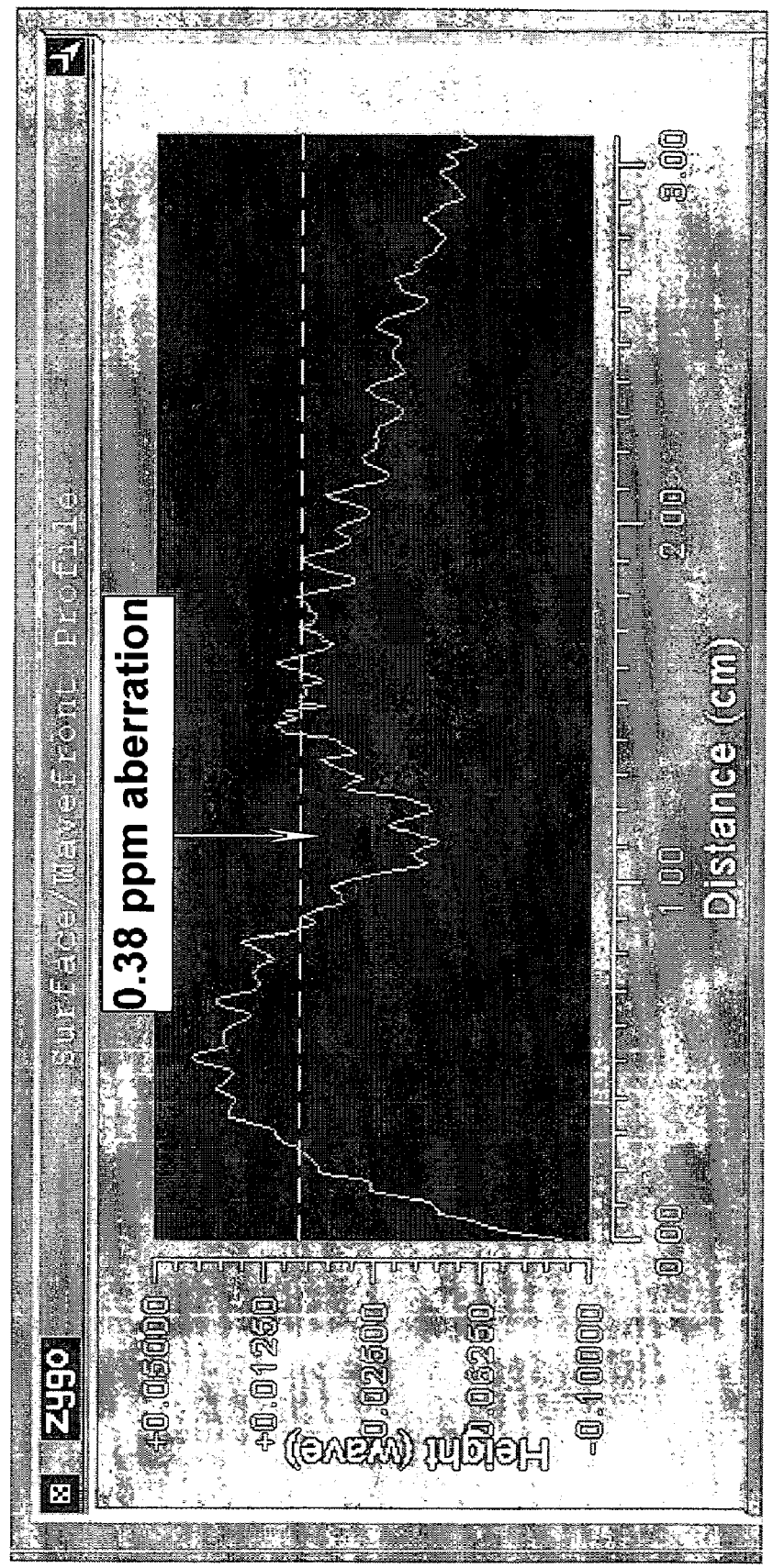
FIG. 15 is a Zygo interferometry analysis result of a fused silica sample made by soot-to-glass process.

FIG. 15 shows interferometry analysis of a silica sample made by soot-to-glass process. The aberration was found to be a result of abrupt changes in the $OMCTS/O_2$ ratios in the soot laydown process, especially because the times when OMTS and $O_2$ flow rates stabilize during the initial stages of laydown were not synchronized; this caused a rapid soot density change at this point and resulted in a differential OH concentration profile in the consolidated glass.

Figure 16:
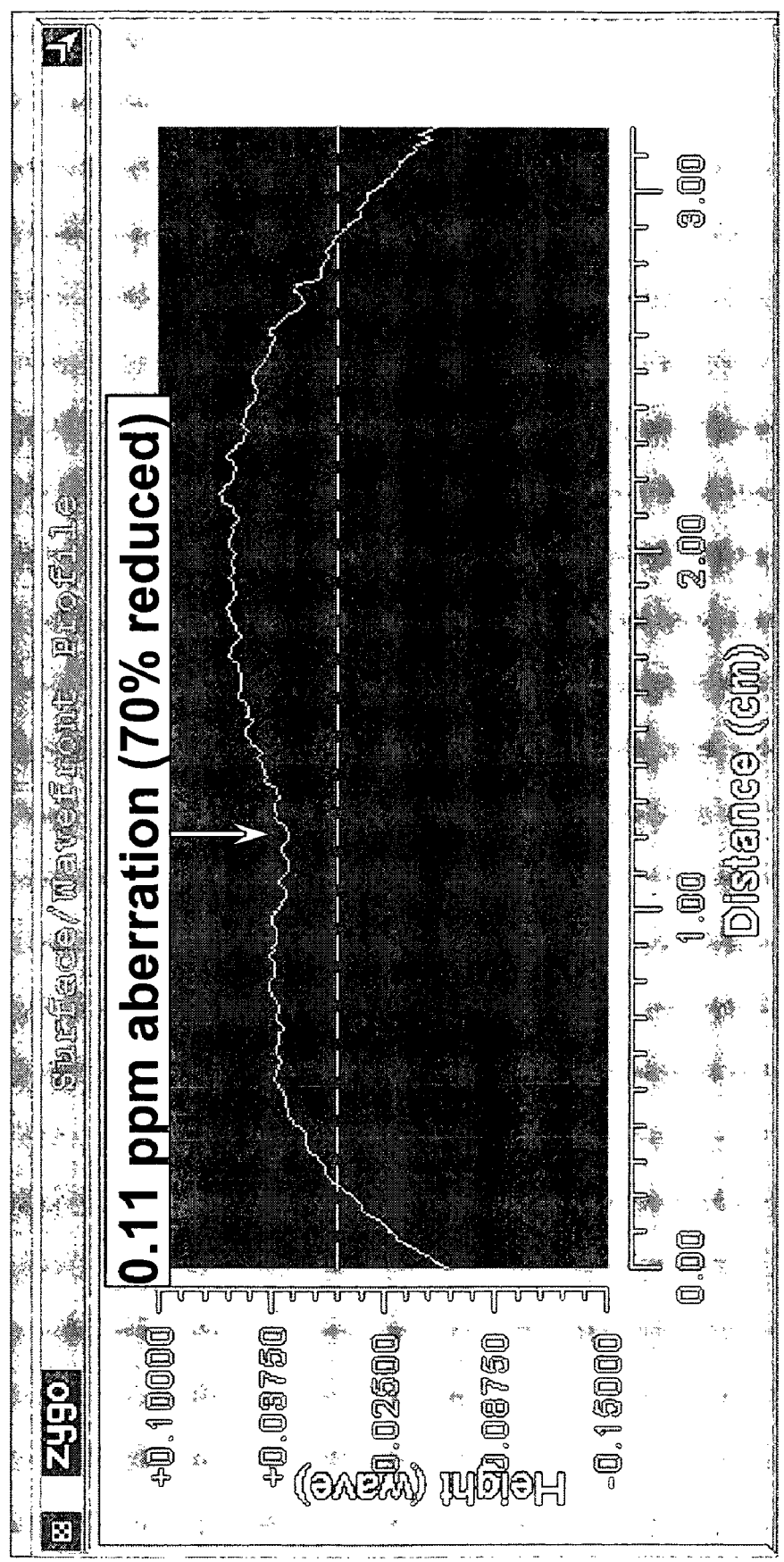
FIG. 16 is a Zygo interferometry analysis result of a fused silica sample made by soot-to-glass process having a much more uniform OH concentration profile than the sample shown in FIG. 15.

FIG. 16 is a Zygo interferometry analysis result of a silica sample made by soot-to-glass process. The aberration as seen in the sample for FIG. 15 was reduced by 70% by better matching the $OMCTS/O_2$ ratios in this step of the soot laydown process. Particularly, in this example, the flow rates of OMCTS and $O_2$ stabilized at the same time during the initial stage of soot laydown. This also resulted in less of a rapid soot density change at this point, thus improving a more uniform OH concentration profile in the consolidated glass.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A synthetic silica glass material with an OH content from 0.1 to 1300 ppm by weight with a variation in OH concentration in a plane perpendicular to an optical axis of the synthetic silica material of less than 20 ppm by weight and greater than 0 ppm by weight.

2. A synthetic silica glass material in accordance with claim 1, further comprising striae in the direction of the axis perpendicular to the plane in which the variation of OH concentration is less than 20 ppm by weight.

3. A synthetic silica glass material in accordance with claim 1 which has a refractive index variation less than 5 ppm in the direction in which the variation of OH concentration is less than 20 ppm.

4. A synthetic silica glass material in accordance with claim 3 which has a refractive index variation less than 2 ppm in the direction in which the variation of OH concentration is less than 20 ppm.

5. A synthetic silica glass material in accordance with claim 1, further containing between $1\times10^{15}$ to $5\times10^{18}$ molecules/cm$^3$ of $H_2$.

6. A synthetic silica glass material in accordance with claim 1, further comprising less than 50 ppm by weight of Cl.

7. A synthetic silica glass material in accordance with claim 1, further comprising less than 10 ppb alkali, alkaline earth, and transitional metal elements.

8. A synthetic silica glass material in accordance with claim 7 comprising less than 1 ppb alkaline earth and transition metals.

9. A synthetic silica glass material in accordance with claim 1 having a fictive temperature between about 800-1200° C. and a variation of fictive temperature of less than 50° C.

10. A synthetic silica glass material in accordance with claim 1 having a fictive temperature between about 800-1200° C. and a variation of fictive temperature of less than 10° C.

11. A synthetic silica glass material in accordance with claim 1 having a birefringence level of less than 2 nm/cm.

12. A synthetic silica glass material in accordance with claim 1 further comprising fluorine.

13. An optical member consisting essentially of the synthetic silica glass in accordance with claim 1, having an optical axis parallel to the axis of the material perpendicular to which the material has a variation of OH concentration of less than 10 ppm.

14. An optical glass member in accordance with claim 13, which has an internal transmission at 193 nm of at least 99.65%/cm along the optical axis.

15. A process for making a synthetic glass material with an OH concentration from 0.1 to 1300 ppm by weight with a variation in OH concentration in a direction perpendicular to an optical axis of the synthetic glass material of less than 10 ppm by weight and greater than 0 ppm by weight the process comprising the following steps:
(i) providing silica soot particles;
(ii) depositing the silica soot particles to form a porous preform having bulk density of 0.20 to 1.6 g/cm$^3$; wherein the preform has a local soot density and a local soot density variation of less than 20%, or less than 0.2 g/cm$^3$, whichever is greater, of an overall density of the porous preform over a distance of 0.2 mm;
(iii) optionally purifying the porous preform;
(iv) consolidating the preform into dense silica.

16. A process in accordance with claim 15, wherein in step (ii), the local soot density variation of the deposited porous preform is less than 10% of the bulk soot density of the preform, or less than 0.1 g/cm$^3$, whichever is greater.

17. A process in accordance with claim 15, wherein in step (ii), the porous preform deposited has a bulk density between 0.25 to 1.0 g/cm$^3$.

18. A process in accordance with claim 15, wherein in step (ii), the soot preformed is deposited by a method selected from OVD, VAD, and planar deposition.

19. A process in accordance with claim 15, wherein in step (i), the silica soot particles are provided by flame hydrolysis of a silicon-containing precursor through oscillating burners and, in step (ii), the oscillation of the burners providing soot particles is randomized in order to homogenize the local soot density.

20. A process in accordance with claim 15, wherein in step (iv), the preform is subjected to a temperature elevation rate of less than 0.4° C./minute between 1150-1450° C.

21. A process in accordance with claim 15, wherein in step (iv), the preform is subjected to a temperature elevation rate of less than 0.4° C./minute between 1000-1600° C.

22. A process in accordance with claim 20, wherein in step (iv), the preform is subjected to a temperature elevate rate of less than 0.2° C./minute between 1150-1450° C.

23. A process in accordance with claim 15, wherein in step (iv), the preform is first isothermally held at a temperature between 1150° C. to 1300° C. for at least 1 hour prior to final densification.

24. A process in accordance with claim 23, wherein in step (iv), the preform is first isothermally held at a temperature between 11500° C. and 1300° C. for more than 5 hours, but less than 200 hours.

25. A process in accordance with claim 15, wherein in step (iv), the preform is consolidated in an atmosphere comprising helium and/or He and water.

26. A process in accordance with claim 15, wherein:
in step (i), the silica soot particles are provided by flame hydrolysis of a silicon-containing precursor compound, wherein the precursor compound has a precursor flow rate and $O_2$ has a $O_2$ flow rate through a burner;
in step (ii), the preform is formed by depositing the soot particles to a rotating supporting surface; and
in steps (i) and (ii), the precursor flow rate and $O_2$ flow rate each change, and wherein a ratio of the changes of the flow rates of the precursor compound and $O_2$ provided to the hydrolysis flame via the burner is maintained substantially steady.

27. A process in accordance with claim 15, wherein in step (i), the silica soot particles are provided by flame hydrolysis of a silicon-containing precursor compound, wherein the precursor compound has a precursor flow rate and $O_2$ has a $O_2$ flow rate through a burner and the ratio of the flow rates of the precursor compound and $O_2$ provided to the hydrolysis flame via the burner is maintained substantially steady.

* * * * *